(12) United States Patent  
Mehta

(10) Patent No.: US 12,254,318 B2
(45) Date of Patent: Mar. 18, 2025

(54) SPECULATIVE REGISTER RECLAMATION

(71) Applicant: Hewlett Packard Enterprise Development LP, Spring, TX (US)

(72) Inventor: Sanyam Mehta, Hopkins, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 122 days.

(21) Appl. No.: 18/143,990

(22) Filed: May 5, 2023

(65) Prior Publication Data

US 2024/0248719 A1     Jul. 25, 2024

Related U.S. Application Data

(60) Provisional application No. 63/441,087, filed on Jan. 25, 2023.

(51) Int. Cl.
    *G06F 9/30*         (2018.01)
    *G06F 9/38*         (2018.01)

(52) U.S. Cl.
    CPC ........ *G06F 9/3013* (2013.01); *G06F 9/30058* (2013.01); *G06F 9/3861* (2013.01)

(58) Field of Classification Search
    CPC .. G06F 9/30058; G06F 9/3861; G06F 9/3842; G06F 9/384; G06F 9/3013
    USPC ......................................................... 712/216
    See application file for complete search history.

(56) References Cited

U.S. PATENT DOCUMENTS

| 8,738,897 | B2 | 5/2014 | Mukkara |
| 9,350,708 | B2 | 5/2016 | Wong et al. |
| 10,149,166 | B2 | 12/2018 | Mazzuca et al. |
| 10,270,603 | B2 | 4/2019 | Yang et al. |
| 10,691,457 | B1 * | 6/2020 | Kountanis ............... G06F 9/384 |
| 2017/0161066 | A1 * | 6/2017 | Tennenhaus ............ G06F 9/384 |
| 2020/0320199 | A1 | 10/2020 | Sheth et al. |

OTHER PUBLICATIONS

Monreal et al., Late Allocation and Early Release of Physical Registers, Oct. 2004, IEEE, vol. 10, pp. 1244-1259 (Year: 2004).*

* cited by examiner

*Primary Examiner* — Chun Kuan Lee
(74) *Attorney, Agent, or Firm* — Yao Legal Services, Inc.

(57) ABSTRACT

A system determines an original instruction with a first logical register (LR) mapped to a first physical register (PR). The system determines a current instruction with a current LR. A prior instruction is associated with a second LR mapped to a second PR. The system allocates the current LR to a third PR. Responsive to determining that the current and prior instructions are executed in different iterations, the system marks the second PR as not eligible for early release. Responsive to determining that the current LR is previously mapped to the first PR, the allocation comprises a redefinition of the first LR. Responsive to determining that the first PR is eligible for early release and that the current and original instructions are executed in the same or consecutive iterations, the system releases the first PR based upon the redefinition and not the prior instruction completing or the current instruction committing.

20 Claims, 12 Drawing Sheets

FIG. 2A

LINES 210:
```
210.1   for (j = 0; active[j] > 1; j++) {
210.2       c = active[j];
210.3       m1 = mgau->mean[c];
210.4       v1 = mgau->var[c];
210.5       dval = mgau->lrd[c];
210.6       for (i = 0; i < veclen; i++) {
210.7           diff1 = x[i]-m1[i];
210.8           dval1 -= diff1 * diff1 * v1[i];
210.9       }
210.10      ...
210.11  }
```

FIG. 2B

LINES 230:
```
230.1   .LBBmgau_eval:
230.2   l1:  lsl     x12, x9, #2              // Line 210.7
230.3   l2:  ldr     s1, [x20, x12]           // Line 210.7
230.4   l3:  ldr     s2, [x10, x12]           // Line 210.7
230.5   l4:  ldr     s3, [x11, x12]           // Line 210.8
230.6   l5:  add     x9, x9, #1               // Line 210.6
230.7   l6:  fsub    s1, s1, s2               // Line 210.7
230.8   l7:  fcvt    d2, s3                   // Line 210.8
230.9   l8:  fcvt    d1, s1                   // Line 210.8
230.10  l9:  fmul    d1, d1, d1               // Line 210.8
230.11  l10: cmp     x9, x26                  // Line 210.6
230.12  l11: fmsub   d0, d2, d1, d0           // Line 210.8
230.13  l12: b.lt    .LBBmgau_eval            // Line 210.6
```

FIG. 2C

| INSTR ID 242 | MAPPING 244 (LOGICAL REG → PHYSICAL REG) | LIFETIME OF PHYSICAL REGISTER 246 | | |
|---|---|---|---|---|
| | | HARDWARE 247 | CPR 248 | SRR 249 |
| l1 | x12 → PR0 | > MemLat | ~ MemLat | ~ 2 |
| l2 | s1 → PR1 | > MemLat | ~ MemLat | ~ 1 |
| l3 | s2 → PR2 | > MemLat | ~ L1Lat | ~ 1 |
| l4 | s3 → PR3 | > MemLat | ~ MemLat | ~ 2 |
| l5 | x9 → PR4 | > MemLat | ~ MemLat | ~ MemLat |
| l6 | s1 → PR5 | > MemLat | ~ MemLat | ~ 1 |
| l7 | d2 → PR6 | > MemLat | ~ MemLat | ~ 2 |
| l8 | d1 → PR7 | > MemLat | ~ MemLat | ~ 1 |
| l9 | d1 → PR8 | > MemLat | ~ MemLat | ~ 1 |
| l10 | cr → PR9 | > MemLat | ~ MemLat | ~ 2 |
| l11 | d0 → PR10 | > MemLat | ~ MemLat | ~ MemLat |

ENTRIES 250

SPECULATIVE REGISTER RECLAMATION

RELATED APPLICATION

This application claims the benefit of U.S. Provisional Application No. 63/441,087, entitled "SPECULATIVE REGISTER RECLAMATION," by inventor Sanyam Mehta, filed 25 Jan. 2023.

BACKGROUND

Field

The number of in-flight instructions continues to increase. While a benefit of more in-flight instructions can involve enabling a higher instruction level parallelism (ILP) and therefore better single-thread performance, a cost can involve larger structures within the core, e.g., the physical register file (PRF), which can increase power consumption and decrease performance. Thus, efficiently releasing physical registers while ensuring correct recovery from misspeculation can address this cost.

BRIEF DESCRIPTION OF THE FIGURES

FIG. 2A illustrates a code excerpt, in accordance with an aspect of the present application.

FIG. 2B illustrates assembly language instructions corresponding to the code excerpt of FIG. 2A, in accordance with an aspect of the present application.

FIG. 2C illustrates a table depicting a comparison of physical register lifetimes across various systems, in accordance with an aspect of the present application.

In the figures, like reference numerals refer to the same figure elements.

DETAILED DESCRIPTION

Figure 1:
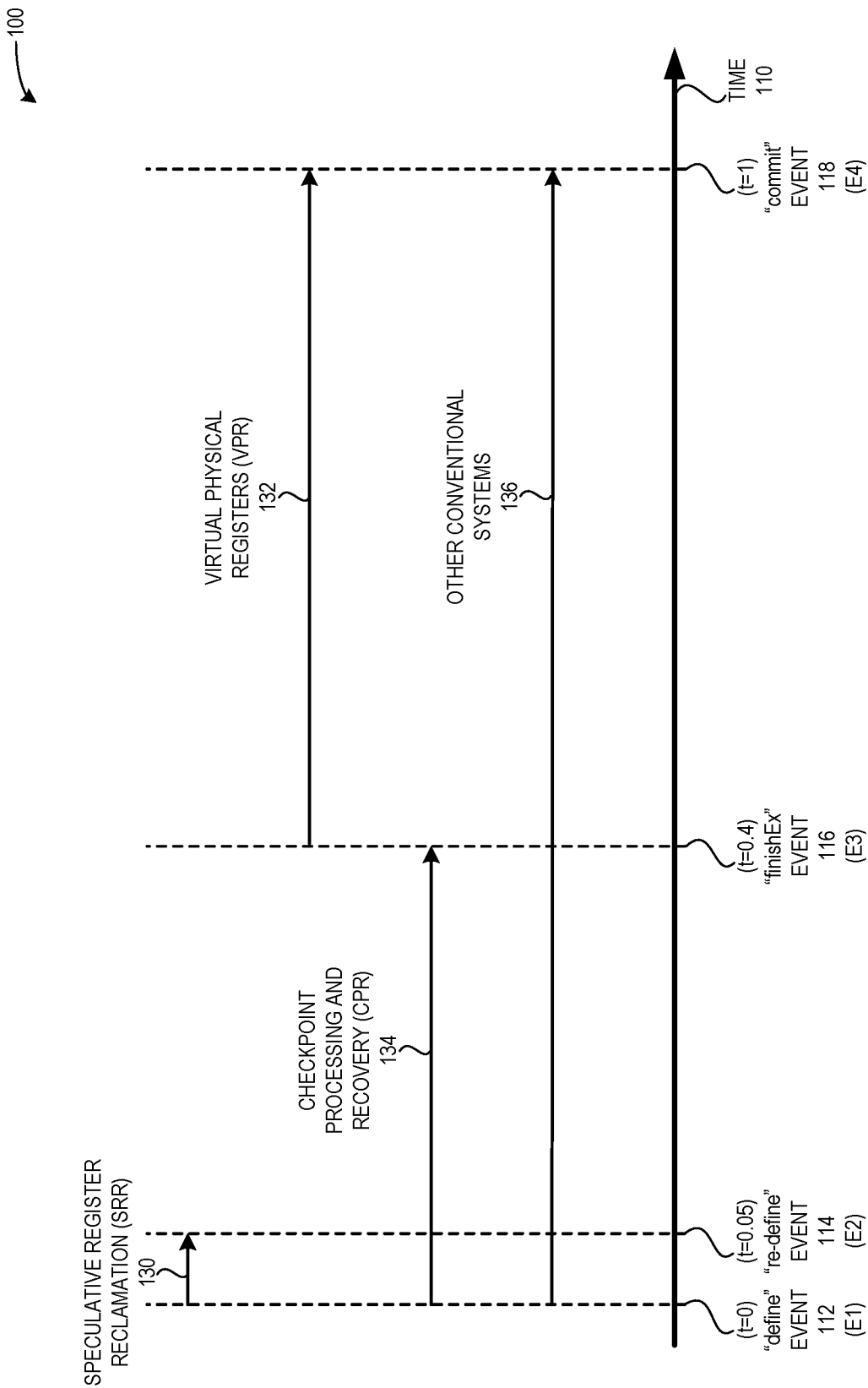
FIG. 1 illustrates a diagram of physical register lifetimes across various designs, in accordance with an aspect of the present application.

Aspects of the instant application provide improvements in reducing the size of the physical register file (PRF) to maintain the increasing number of in-flight instructions. The described aspects (also referred to as speculative register reclamation or "SRR") can leverage the insight that within loops, where most time is generally spent, most logical registers are redefined in the same or immediate next iteration. This allows the physical registers allocated to most of these logical registers to be aggressively and speculatively released at redefinition rather than when the redefining instruction commits (as in conventional systems). The described aspects can augment existing tables and data structures (e.g., the register alias table (RAT), the reorder buffer (ROB), and the scheduler) to determine eligibility for "early release" (i.e., releasing a previously mapped physical register upon redefinition of a corresponding logical register). The described aspects can further employ a payload random access memory (RAM) for data writeback and bypassing and allow for switching between the SRR and normal modes, thus providing an improved system for speculative register reclamation.

Moving from one generation of chips to the next has become increasingly expensive, both in terms of cost and time. Current trends to implement this move can involve, e.g., building custom chips, optimizing software/code, and using chiplets in favor of monolithic chips to migrate to smaller process nodes (and more cores). However, while building custom chips may be useful for certain areas/applications (such as artificial intelligence), many users continue to use the general purpose compute capability provided by central processing units (CPUs), e.g., in the cloud. For these users, single thread performance remains an important factor. On the other hand, co-locating multiple users/applications (as tenant users) on a single node can result in increasing core counts in a chip. As a result, improvements in core microarchitecture design remain crucial to provide performance gains at similar transistor counts which allow increasing core counts while ensuring quality of service (QOS) to each tenant user.

The number of in-flight instructions continues to increase, based on factors such as: a break from pure multi-core scaling to hybrid architectures with a mix of large performance and small efficiency cores for the purpose of containing overall chip power; better cooling technologies allowing more than 400 W power draw in server chips; bigger cores enabled by the move to chiplet architecture, where the core area does not severely limit overall core count; and an ever-increasing demand for single-thread performance.

A large instruction window can imply increasing the size of core structures such as the physical register file (PRF) and the scheduler. Since these structures are many-ported and sometimes very wide (e.g., the vector/floating-point register file), these structures can consume considerable area and power and may also be involved in the critical path of the core.

The described aspects address the issue of large physical register files by providing a system and method which can reduce the size of the PRF using SRR, by aggressively and speculatively releasing physical registers upon redefinition of the corresponding logical register (as described below in relation to FIGS. 1-3) as well as using a payload RAM for data writeback and bypassing (as described below in relation to FIG. 5).

The terms "functional unit" and "execution unit" are used interchangeably in this disclosure to refer to a portion, component, unit, or module of a processing program or unit which can perform operations and calculations forwarded from an instruction or an instruction unit. The terms "conventional systems," "existing systems," conventional designs," and "existing designs" are used interchangeably in this disclosure and refer to any approach, system, method, architecture, or design which currently exists and over which the described aspects of SRR demonstrate significant improvement.

Speculative Register Reclamation (SRR)

The lifetime of a physical register can be marked by four key stages or events. The first event (E1) can be referred to as "define," which is when an instruction I1's result (i.e., logical) register (LR) is assigned a physical register (e.g., PR1). The second event (E2) can be referred to as "redefine," which is when LR is redefined in another instruction I2 and reassigned a different physical register (e.g., PR2). The third event (E3) can be referred to as "finishEx," which is when instruction I1 finishes execution (which may sometimes happen before "redefine") and writes result to PR1. The fourth event (E4) can be referred to as "commit," which is when instruction I2 commits its result to the architectural state and physical register PR1 is finally freed. No instruction after I2 (i.e., after "redefine") uses PR1 although PR1 is kept alive until "commit" to ensure correct mis-speculation recovery and precise exception handling in current microarchitectures.

FIG. 1 illustrates a diagram 100 of physical register lifetimes across various systems, in accordance with an aspect of the present application. Diagram 100 denotes time 110 from left to right and includes the following "events" at various relative times: a "define" event 112 (E1) at time t=0; a "re-define" event 114 (E2) at time t=0.05; a "finishEx" event 116 (E3) at time t=0.4; and a "commit" event 118 (E4) at time t=1.

The described aspects of SRR provide a method and system which can aggressively and speculatively reclaim certain physical registers that reach the "redefine" stage or event. On average, a physical register may spend ~40% of its total lifetime until "finishEx" (event 116) and ~60% from "finishEx" to "commit" (event 118). On the other hand, "redefine" (event 112) may happen soon (at ~5% of total register lifetime) after "define" (event 112). Thus, in comparison to prior designs that may reclaim registers at "finishEx" (like Checkpoint Processing and Recovery (CPR) 134) or may allocate registers at "finishEx" (like virtual physical registers (VPR) 132), the described aspects of SRR can target much larger savings. Furthermore, SRR occurs at the "redefine" event and can be considered speculative because the redefining instruction I2 is not guaranteed to commit.

Diagram 100 indicates the various times during the lifetime of physical registers that the physical registers may be reclaimed or released, based on the approach used. For example, diagram 100 depicts the following for existing or conventional systems: the VPR 132 approach may take from "finishEx" to "commit" before the physical register is released; the CPR 134 approach may take from "define" until "finishEx" before the physical register is released; and other conventional systems may require the entire time from "define" to "commit" before the physical register is released. In contrast, diagram 100 also depicts that SRR 130 may only take from "define" to "re-define" before the physical register is released, which is a significantly shorter amount of time in the overall lifetime of a physical register.

Ensuring Correct Recovery from Branch Mispredictions

One key insight for SRR is that a necessary condition for any aggressive reclamation strategy is to ensure correct recovery from branch mispredictions (and precise exceptions). Any recovery from a branch misprediction may involve restoring saved RAT state, which may only be done at certain intervals of instructions. As a result, releasing registers at "redefine" must involve identifying a window of instructions (e.g., "W1") whose destination physical registers are tracked to see if some of them may reach "redefine" quickly and could thus be aggressively and speculatively released. Releasing registers at "redefine" must also involve identifying another window of instructions (e.g., "W2") following W1 until which instructions in W1 must be tracked.

To determine what these windows W1 and W2 should be, W1 and W2 must satisfy two contradictory properties. On one hand, a first property can be that W1 and W2 should be such that registers reaching "redefine" by the end of W2 are maximized so more of them can be released early. On the other hand, a second property can be that W1 and W2 should not be large, since in order to ensure correct mis-speculation recovery, no instruction in W1 can commit unless all instructions in W2 finish execution and are no longer speculative. This is because W2 may incorrectly lead to release of physical registers in W1 due to a mis-speculation.

To determine the size of these windows W1 and W2, it has been observed that in loops, where most of the program time is spent in general, most logical registers are redefined (i.e., reach "redefine") in the same or the immediate next iteration. Thus, if W1 is a single loop iteration, and if W2 is the immediate next iteration, many physical registers allocated in W1 could potentially be freed by tracking their redefinition until W2, which can thus satisfy the first property governing window sizes. Furthermore, because innermost loops are usually small, W1 and W2 are both a few instructions in most cases, which can thus satisfy the second property governing window sizes.

Among all registers allocated in W1 (and redefined before W2), only registers that are used in W2 prior to redefinition (i.e., registers with "cross-iteration" consumers) need to remain allocated until "commit" since these registers are essential to recover from mis-speculations and to enable precise exceptions. In general, only the induction and reduction variables (such as those storing counts, etc.) have cross-iteration consumers, whereas many other variables serve as temporary storage and may only be used within a single iteration. For example, on average, 80% of all physical registers allocated may have no cross-iteration consumers and may thus be eligible for early release. A concrete example is described below in relation to FIGS. 2A-C. Thus, leveraging the observations related to this key insight can significantly reduce the lifetime of a physical register and the number of physical registers needed in the first place.

Using ROB IDs of Producer Instructions and Using a Payload RAM However, one problem remains. In current microarchitectures, even though a physical register may reach "redefine," the physical register still needs to remain allocated until at least "finishEx." This is because its physical register ID is used as a tag to wake up the consumer instructions waiting in the scheduler and to forward data to the PRF where it is buffered until the consumer instructions are ready to execute. In the described aspects of SRR, waiting for "finishEx" is not an option because the loops that need the most physical registers are the ones with one or more long latency loads, and it is in these loads where "finishEx" usually happens significantly later than "redefine." Therefore, for maximum benefit, SRR must continue to reclaim registers aggressively after "redefine" instead of "finishEx."

If a physical register were to be reclaimed after "redefine," neither would the physical register be available to buffer data until execution start nor would its physical register ID be available to be used as a tag for consumer instruction(s) wakeup. In another key insight, the described aspects address this problem by storing the ROB entry ID of the producer instructions instead of their physical register ID for each instruction in the scheduler, as described below in relation to FIG. 3. Consequently, the ROB entry of the producer can be used as a tag to wakeup dependent consumer instructions in the scheduler.

Moreover, the described aspects can use a payload RAM to buffer data to feed the execution unit instead of using the PRF, which can complement the SRR aspects described herein. Thus, an instruction's physical register can be released early in "redefine" at the expense of its payload RAM entry remaining allocated until "finishEx." The payload RAM can essentially serve as an effective substitute to the expensive register file, leading to much smaller register files. The payload RAM can be a distributed structure (like the scheduler) and does not hold data until instruction commit. Thus, the payload RAM may not be as big and power-hungry as the PRF.

Furthermore, unlike the PRF which is written by every finishing instruction (with a destination) in conventional systems, in SRR, the use of the payload RAM can reduce such expensive PRF writes by ~80% (on average). In addition, the payload RAM may only be written to when at least one of the consumers is still not ready to execute. Since a producer may often have very few consumers, the payload RAM may not often be written to, which can lead to crucial dynamic power savings. Finally, whenever a physical register cannot be released early, the data can be written to the PRF as in conventional systems and read into the payload RAM entries of any consumers that may enter execution in future.

Thus, the described aspects of SRR can leverage the insights related to defining window IDs and sizes, using ROB IDs as tags, and using the payload RAM, to provide a system which can speculatively and aggressively reclaim registers, which can result in a reduction in the size of the PRF and an overall increase in the performance and efficiency of the core architecture. For example, it has been observed that SRR can achieve a 50% reduction in PRF size while still achieving a 1.05× improvement in performance over existing designs. Various core structures have been measured to consume 26% less power with SRR. By diverting these resource savings to other structures in the core (such as the scheduler and ROB), the performance improvement can increase to 1.14×.

Improvements of SRR Over Prior Approaches

The described aspects of the instant application differ from and provide improvements over various prior approaches. One prior approach, Checkpoint Processing and Recovery (CPR), uses checkpoints instead of an ROB, which allows it to roll back to the checkpoint start instruction in the event of a misprediction or memory exception. Also, as a result, physical registers can be reclaimed for instructions that are not known to be branch-safe or memory-safe. All allocated registers that are not live (i.e., reached "redefine") at the next checkpoint start instruction can be marked to be released as soon as they reach "finishEx." In CPR, registers in a window are not tracked beyond that window for reclamation opportunities. Using the terminology of the instant disclosure, W1 and W2 are the same in CPR.

The described aspects differ from CPR in three areas. In a first area, W2 and W1 are not the same. SRR can leverage the observation that aligning W1 and W2 to consecutive loop iterations (i.e., the same instructions in W1 and W2, just different iterations) can offer a significant opportunity to aggressively reclaim registers (as shown in relation to FIGS. 2A-C). In a second difference, the described aspects do not wait for instructions whose registers are marked for early release to finish execution (i.e., reach stage "finishEx") for them to be released. Instead, the described aspects can release these marked physical registers at "redefine," which can result in a significant performance advantage for memory-bound codes (as shown in relation to FIG. 2C). In a third difference, checkpoint-based architectures have not been successful in industry as there are no such known commercial designs. In contrast, the described aspects leverage an ROB-based design for easier adoption by industry while still ensuring correct mis-speculation recovery and precise exceptions. Furthermore, the ROB-based design of the described aspects can enable switching to normal execution when aggressive register reclamation may be deemed unprofitable.

Another prior approach, Continue Flow Pipelines (CFP), uses a slice buffer to queue long latency loads and their dependent instructions. While the instructions entering the slice do not need to wait to reach stage "finishEx" (as with CPR), a major difference from the described aspects can involve re-execution. When the slice re-enters the scheduler to re-execute, CFP may require physical-to-physical renaming (i.e., re-renaming using a new mapping table) due to the aggressive register reclamation. Thus, the CPR proposal may require too many additional structures that increase both design complexity and energy consumption, while also relying on checkpoints instead of an ROB.

In yet another prior approach, virtual physical registers (VPR) can be used to artificially increase the number of physical registers and serve the purpose of physical registers for dependence detection among instructions. A VPR may be finally allocated a physical register upon write-back (or at execution). Unlike the described aspects which free physical registers after "redefine," VPR allocates registers at "finishEx," which remain allocated through "commit." As described above in relation to FIG. 1, the number of cycles spent between "finishEx" and "commit" can be significant (~60% of total register lifetime) given in-order instruction commit, thus rendering VPR less efficient than the described aspects.

Code Excerpts Showing Reduction of Physical Registers Using SRR

The example provided below in relation to FIGS. 2A-C demonstrate that most registers in a loop tend to have a short live range, i.e., most registers are defined and used in the same iteration ("iteration-local live range"), while fewer registers are used across different iterations ("cross-iteration live range"). FIG. 2A illustrates an exemplary code excerpt 200, in accordance with an aspect of the present application. Exemplary code excerpt 200 can be an excerpt from the Sphnix3 Speech Recognition benchmark from the Standard Performance Evaluation Corporation (SPEC) Central Processing Unit (CPU) 2006 suite, and can include lines 210, indicated as lines 210.1-210.11. FIG. 2B illustrates assembly language instructions 220 corresponding to the code excerpt of FIG. 2A, in accordance with an aspect of the present application. Assembly language instructions 220 can include lines 230, including lines 230.1-230.13, where lines 230.2-230.12 correspond to instructions I1-I11, respectively. Corresponding code lines (of 210.1-210.11) are depicted with their code line label for each line or instruction of FIG. 2B. FIG. 2C illustrates a table 240 depicting a comparison of physical register lifetimes for a conventional hardware design, the CPR system, and aspects of the system described herein (referred to as "SRR"), in accordance with an aspect of the present application. Table 240 can include entries 250 indicating and corresponding to each of instructions I1-I11 of FIG. 2B, where an entry in table 240 can include the following columns, fields, or information: an instruction identifier (ID) 242; a mapping 244 of a logical register to a physical register; and a lifetime of a physical register 246, for hardware 247, CPR 248, and SRR 249.

In code excerpt 200 of FIG. 2A, the loop-nest which includes lines 210.6-210.9 may result in the most time-consuming portion of this benchmark code excerpt. Consider the innermost loop i beginning at line 210.6. Note that the variable diff1 is defined in line 210.7 and used in line 210.8. Because this variable is redefined in line 210.7 on the next iteration, the live range of this variable is from line 210.7 to line 210.8 within the same iteration (i.e., iteration-local live range).

On the other hand, the variable dval1 (which is a reduction variable) is defined in line 210.8 and then used again in line 210.8 on the next iteration. The live range of dval1 is also short but spans across iterations (i.e., cross-iteration live range). In addition to dval1, the induction variable i also similarly has a short live range that spans across iterations. Thus, based on the source, it can be seen that all variables in code excerpt 200 have short live ranges. Of those variables, a few have iteration-local live ranges while others have cross-iteration live ranges. However, in looking at the corresponding assembly code in FIG. 2B, it can be seen that there are many more variables with iteration-local live ranges than cross-iteration live ranges. For example, each of the three load operations in loop i are assigned unique logical registers (e.g., registers s1-s3 in instructions I2-I4 of FIG. 2B), all of which have iteration-local live ranges. Similarly, register x12 in instruction I1 has an iteration-local live range. Thus, code excerpts 200 and 220 demonstrate that there are more variables with iteration-local live range than cross-iteration live range.

Consider the outer loop j beginning at line 210.1. Many of the variables/registers (such as in lines 210.2-210.5 in FIG. 2A) have an iteration-local live range. While the example depicted in FIGS. 2A and 2B is a simple example, this observation can be generally true because complex instructions in the source are broken into micro operations in the assembly/object code requiring the use of more registers with iteration-local live range.

More Registers May be Reclaimed Early in SRR than CPR

Because the prior design of CPR relies on checkpoints, the instant application refers to instructions within two consecutive checkpoints as a CPR window ("CW"). In CPR, among all physical registers allocated in a CW, only those physical registers that reach "redefine" within the same CW may be eligible for early release. Thus, using the previously described W1 and W2 of the instant application, if W1 is equal to CW, then W2 and W1 are the same in CPR, i.e., CPR does not track registers allocated in W1 beyond W1 for more reclamation opportunities. Applying this criteria to the example of FIGS. 2A and 2B, physical registers for instructions I1, I4, I5, I7, I9, I10 and I11 must all remain allocated assuming that checkpoint starts at the beginning of the loop, because these instructions are not redefined before the start of the next iteration/checkpoint (i.e., these instructions are only reach "redefine" in the next iteration/checkpoint). This may include quite a few physical registers, i.e., not insignificant in number.

These instructions thus need to hold their physical register until "commit," which in a checkpoint architecture can imply the retirement of the next checkpoint or completion of all instructions of the next checkpoint. Because some of these instructions may depend on data from main memory, the lifetime of physical registers associated with these instructions can nearly equal the main memory access time (i.e., memory latency or "MemLat"), as shown in the column for hardware 247 and CPR 248 of FIG. 2C.

In contrast, the described aspects of SRR can extend W2 beyond W1, which can result in the foresight that logical registers x12 (I1), s3 (I4), d2 (I7), d1 (I9) and cond (I10) defined in W1 are redefined in W2 without being used (i.e. have no cross-iteration consumers), and thus it is unnecessary to hold their corresponding physical registers from W1 for misprediction recovery. To achieve this, the described aspects can augment the register alias table (RAT) entry for instructions with the Window ID ("WID") of each issuing instruction. The WID can be incremented at the start of a loop or after every certain number of instructions. Cross-iteration consumers can be determined by comparing WIDs of each producer-consumer pair, while redefinition within W2 can be confirmed by comparing WIDs of prior and incoming instructions which are mapped to the same logical register in the RAT. Thus, in the described aspects of SRR, only PR4 and PR10 need to remain allocated until "commit," making their lifetime on the order of memory latency (i.e., "MemLat"), as shown in the column for SRR 249 of FIG. 2C.

Registers May Be Reclaimed More Quickly in SRR than CPR

In existing designs, a physical register can be freed at "commit," which may occur much after "redefine" and "finishEx." For example, in FIG. 2B, even though some instructions have short latency (e.g., I1, I5 and I10), these instructions may still need to wait for older memory operations to complete and commit results before releasing their physical registers. Furthermore, since instructions commit in order, the actual lifetime of these instructions may be even longer than the memory access time (i.e., "MemLat") as indicated in FIG. 2C. CPR may aid in reducing this exaggerated lifetime because physical registers that have reached 'redefine' at the end of a checkpoint need no longer wait for "commit," but can be released after finishing execution (i.e., "finishEx") and forwarding the results to all consumers. However, this may not be sufficient because "finishEx" may often occur much later than "redefine."

For example, m1[i] (i.e., the operation indicated by Instruction I2 in FIG. 2B) can represent an indirect load that often comes from memory by evading the hardware prefetcher. As a result, this operation can be a long latency operation. Thus, even though PR1 (allocated by I2) reaches "redefine" quickly (in instruction I6 in the same iteration), PR1 must remain allocated until the load from memory completes (i.e., until 'finishEx' is reached for that operation). Thus, as shown in FIG. 2C, the lifetime of PR1 can nearly equal the main memory access time with CPR. The same is true for consumers of PR1, such as instruction I6.

The described aspects of SRR can adopt a more aggressive strategy by releasing eligible registers without waiting until "finishEx." In the example, PR1 has no cross-iteration consumer and is thus eligible for aggressive reclamation with SRR. Since SRR can reclaim it after "redefine" (based on the insights described above), PR1 can be released within a very few cycles, i.e., as soon as instruction I6 is renamed. This swift reclamation after "redefine" can be enabled with the help of extending the scheduler with a payload RAM that provides data to consumers while many of the producer physical registers are released early.

Similar to I2, another long latency load in I4 involving PR3 can also be aggressively released with SRR. As a result, not just PR1 and PR3, but also their chain of dependents (I6, I7, I8, I9, and I11) can release their physical registers early as they do not need to wait for instruction completion. The described aspects of SRR can result in reducing the lifetime of these registers and their consumers from an order of memory latency (i.e., "MemLat") in CPR to just a few cycles (i.e., ~1-2), as shown in the column for SRR 249 of FIG. 2C.

Thus, SRR can allow not only many registers to be reclaimed early, but cab also considerably shorten the lifetime of many registers. Both of these improvements can contribute to a reduced number of required physical registers in the microarchitecture.

Design of SRR to Facilitate Speculative Register Reclamation

Figure 3:
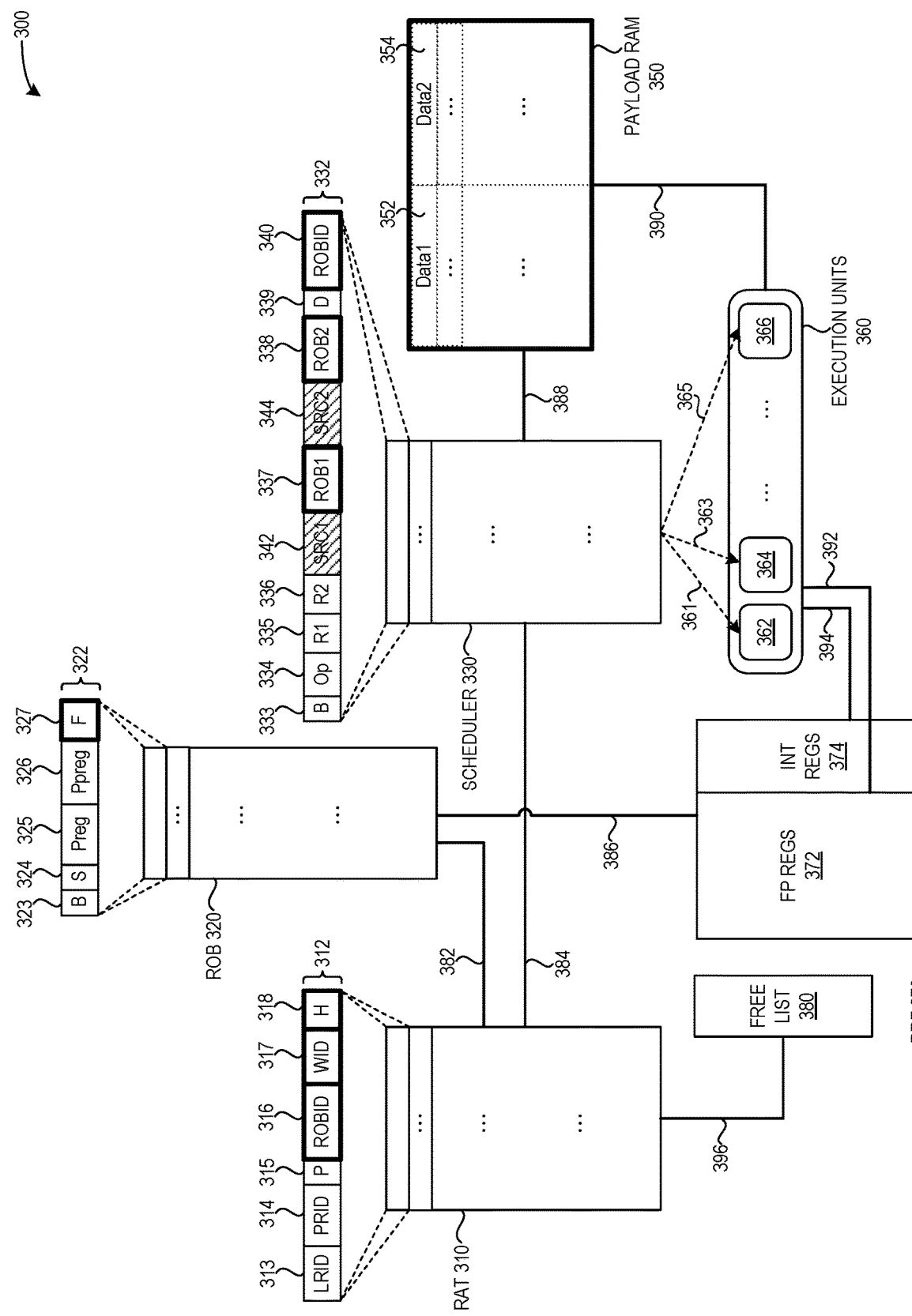
FIG. 3 illustrates a diagram of core structures used in handling instructions, including changes to entries in the register alias table (RAT), the reorder buffer (ROB), and the scheduler, in accordance with an aspect of the present application.

FIG. 3 illustrates a diagram 300 of core structures used in handling instructions, including changes to entries in the register alias table (RAT), the reorder buffer (ROB), and the scheduler, in accordance with an aspect of the present application. Diagram 300 depicts: a RAT 310 with an entry 312; an ROB 320 with an entry 322; a scheduler 330 with an entry 332; a payload RAM 350; execution units 360, including execution units 362, 364, and 366; a physical register file (PRF) 370 with floating point registers ("FP Regs") 372 and integer registers ("Int Regs") 374; and a free list 380. The fields of RAT entry 312, ROB entry 322, and scheduler entry 332 are described below. Augmented or newly added fields are denoted with a bold border while replaced or removed fields are denoted with a left-slanting diagonal fill pattern.

Renaming Unit or Register Alias Table (RAT)

The renaming unit (or RAT 310) can be the structure that holds the latest map of logical registers to physical registers. Each incoming instruction can update the logical to physical register mapping to denote the latest state. In conventional systems, a RAT entry (e.g., 312) may contain only the mapping of the logical register ID (LRID 313) to the corresponding physical register ID (PRID 314) and a separate bit-vector P 315 for each physical register (that can be directly updated at instruction completion). In FIG. 3A, the LRID (313) and the P bit (315) are depicted to be part of a single RAT entry (312) for simplicity.

A freshly decoded instruction can enter the renaming stage and update the RAT entry of its destination logical register with its newly allocated physical register ID (from the free list 380 of physical registers) (via a communication 396). The P bit can be reset (i.e., set to "0") to indicate that this instruction is not yet complete. The P bit can be set (i.e., set to "1") when the instruction finishes execution. The value of the P bit can be used to indicate to a later consumer instruction that its source operand(s) is ready.

The described aspects can augment the RAT with the ROBID (316) and window ID (WID 317) of the incoming instruction and a hold bit (H 318), as shown in FIG. 3. When the RAT entry for an instruction is first created, the hold bit H can be reset (i.e., set to a default or initial value of "0"). When the hold bit is set (i.e., set to "1"), this can indicate that the associated physical register must remain allocated and cannot be early released. Creating a RAT entry is described below in relation to FIG. 7A. Updating the WID is described below in the section titled "Changes to Renaming."

The Scheduler

The scheduler (330) can track instructions that need to wait for source operands to become available and select those instructions to enter execution once their operands become available (e.g., via communications 361/363/365 to, respectively, execution units 362/364/366). In conventional systems, a scheduler entry (e.g., 332) may include the following fields: a busy bit (B 333); an instruction/operation field (Op 334); ready bits (R1 335 and R2 336); source operand fields containing respective physical register IDs (SRC1 342 and SRC2 344); and a destination field (D 339) containing the physical register ID of the destination register allocated to the instruction.

The described aspects can augment the scheduler to also contain the ROB ID of the destination instruction (ROBID 340) (obtained from the RAT) alongside the physical register. On the other hand, the source physical register IDs (SRC1 342 and SRC2 344) can be replaced with the ROB IDs (ROB1 337 and ROB2 338) of the source instructions (also obtained from RAT lookups), as shown in FIG. 3. Creating a scheduler entry is described below in relation to FIG. 7A.

Payload RAM

System architecture designs may exist both with and without a payload RAM. In architectures without a payload RAM, the operands may only reside in the physical register file (PRF). When an instruction is ready to enter execution and is woken up by the scheduler, the PRF (which is indexed by the scheduler's SRC1 and SRC2 bits) can provide the operand values to the functional unit in order to start execution. When an instruction finishes execution, the functional unit can write the result to the destination physical register.

In architectures with a payload RAM (350), the operand values can be buffered in the payload RAM (e.g., as described below in relation to 520 of FIG. 5), which then alone can provide the operand values to the execution unit (360, including 362, 364, and 366), instead of both the payload RAM and register file which would require more ports at the execution unit. When an instruction finishes execution, the result can be forwarded to both the PRF (via communications 392 and 394) and also to the waiting consumers in the payload RAM (via a communication 390 and also as described below in relation to output 574 of FIG. 5).

While the design without a payload RAM may have the advantage of a smaller scheduler, the design with the payload RAM can lead to fewer read ports in the PRF that now becomes a function of the dispatch width instead of the number of execution ports. This is because the PRF is read immediately after the renaming (i.e., "redefine") stage (into the payload RAM) instead of at execution start (into the functional units), as in the design without a payload RAM.

Similarly, the design with a payload RAM can result in a significant reduction in the scheduler's read ports because since the scheduler's entries are no longer used to index the register file to provide data. The data is already in the payload RAM. On the other hand, since the payload RAM must receive data both from the physical register file (before/during instruction dispatch) and from the functional unit (at instruction completion), the write ports on the payload RAM may be expensive.

However, the size of the payload RAM can be considerably smaller than the size of the physical register files. This is due to two factors. First, the lifetime of an instruction in the payload RAM (like the scheduler) can be much smaller than the physical register file. Second, the scheduler (including the payload RAM) can be distributed across (sets of) functional units, unlike the physical register files. Data writeback and bypassing is described below in relation to FIG. 5.

Thus, the described aspects of SRR use a scheduler with a payload RAM, because this can result in the possibility of a significant reduction in the size of the physical register file.

Reorder Buffer (ROB)

The ROB (320) can enable in-order instruction commit even as instructions execute out-of-order. The ROB can thus enable speculation across branches with the ability to still recover correctly from mispredicted branches and can also ensure precise exceptions. Because the ROB contains all the active instructions at any time, the size of ROB is the size of the instruction window. In conventional systems, an ROB entry (e.g., 322) can contain fields such as: a busy bit (B 323); state bits (S 324), which indicate whether the instruction is pending or finished; a physical register (Preg 325) assigned to this instruction; and a previous physical register (Ppreg 326—obtained from the RAT) that mapped this instruction's logical register. The ROB entry (322) can also include a few other bits for book-keeping. The Ppreg field (326) can be used to free the indicated register when this instruction commits, which is the mechanism used for register reclamation in conventional systems.

The described aspects can augment the ROB entry (322) by adding a free bit (F 327) to indicate whether the Preg (325) associated with this ROB entry is early released or not. Creating a ROB entry is described below in relation to FIG. 7A.

Improvements to Renaming Stage

As described above, aspects of SRR can operate on windows of instructions. In the renaming stage (i.e., "redefine"), each instruction can be assigned a window ID (WID). A certain contiguous chunk of instructions can all be assigned the same WID, while the next chunk of instructions can be assigned WID+1, and so on. As discussed above, mapping windows to loop iterations can achieve improved results. In order to effect this, each issuing instruction's program counter (PC) and the last PC that started a window can be tracked. If an issuing instruction's PC matches the starting PC of the last window, a new window is started, which can result in naturally aligning itself to loops. In addition, the described aspects can use a lower and upper limit of 5 and 24 instructions, respectively, on the window size. Unless a loop is identified, a new window can start at the next branch after reaching the upper limit. All new windows can be started at branches unless the absolute upper limit on window size (e.g., 72 instructions) is reached. Branches can be where the processor already checkpoints RAT state. This choice can help to naturally align to individual loop iterations as desired by SRR. The checkpointed RAT state may still be needed to recover from mis-speculation, as in conventional systems, although the recovery mechanism in SRR can be slightly different than in conventional systems. The lower limit on the window size of 5 can be governed by the maximum number of checkpoints, while the upper limit of 24 and the absolute upper limit of 72 can be chosen to limit the re-execution overhead while simultaneously benefiting from early reclamation.

In each cycle, an issuing instruction can perform two actions on the RAT. An issuing instruction can update the RAT to indicate the new logical register to physical register mapping, and the issuing instruction can read the physical register IDs of its source operands which is then passed on to the scheduler (via a communication 382).

The described aspects of SRR can perform two additional checks. In the first check, the system can compare the window IDs of each producer-consumer pair. If these WIDs do not match (indicating a cross-window or cross-iteration use), the system can set the H bit for the producer (i.e., set to a value of "1"). In the second check, for the entry that is being updated by an issuing instruction, the system can check its H bit and compare its WID (i.e., the last mapped instruction's WID) with the newly issuing instruction's WID. If the H bit is not set (i.e., set to a value of "0") and the WIDs are the same or off by 1, this indicates that the old physical register was redefined in the same or immediate next window without any cross-window uses and the register can thus be (early) released without compromising misprediction recovery.

In this case, if the last mapped instruction has not already finished execution (indicated by the P bit in the RAT), then the physical register associated with this last mapped instruction can be released (i.e., added to the free list (380) of physical registers) and the free bit F can be set (i.e., set to a value of "1") in its ROB entry. These two additional checks, along with the setting of various fields and the early release, is described below in relation to FIG. 7B.

Furthermore, in order to prevent the core from trying to release this already released physical register in the "commit" stage, the system does not update the Ppreg field of the ROB entry of the newly issuing instruction with the PRID of the last mapped instruction's destination (which is performed in conventional systems). In the described aspects of SRR, the Ppreg field remains set to NULL, indicating that the corresponding physical register was early released in "redefine" stage.

Improvements to Execute Stage

In conventional systems, the scheduler can forward the PR ID of the destination to the functional unit when the instruction enters execution. This PR ID can be used as the tag that is broadcast (at instruction completion) to the scheduler. The schedule can then select the consumers whose ready bits (R1/R2) must be set and those consumers that must receive the data in the payload RAM (if present). However, in SRR, the physical register may have been early released at this point.

In the described aspects of SRR, the scheduler can instead forward the ROB ID of the destination to the functional unit (via communications 361/363/365 to, respectively, execution units 362/364/366), which ROB ID can be later broadcasted and used to set ready bits and provide data for consumers. The PR IDs of consumers in the scheduler (SRC1 342 and SRC2 344, indicated as replaced or removed with the left-slanting diagonal fill pattern) may no longer be needed for the purpose of tag matching. This wakeup logic in the scheduler can be similar in SRR as in conventional systems: matching on the ROB ID instead of the PR ID. Note that the PR ID of the destination can still be needed in the scheduler and can be used to write data in the PRF whenever the corresponding physical register is not eligible for early release with SRR. Broadcasting based on the ROB ID is described below in relation to FIG. 7C.

Improvements to Writeback Stage

In the writeback stage, conventional systems write the value of the completed instruction to the corresponding destination register in the PRF. However, In SRR, the destination physical register may often already be released at this point and has no future consumers. This condition can be determined by checking the free (F) bit of the ROB entry, which can be done alongside updating state (S) bits in the ROB to indicate the instruction finish. If the F bit is set (i.e., set to a value of "1"), the system in SRR can skip writing to the PRF altogether.

Figure 5:
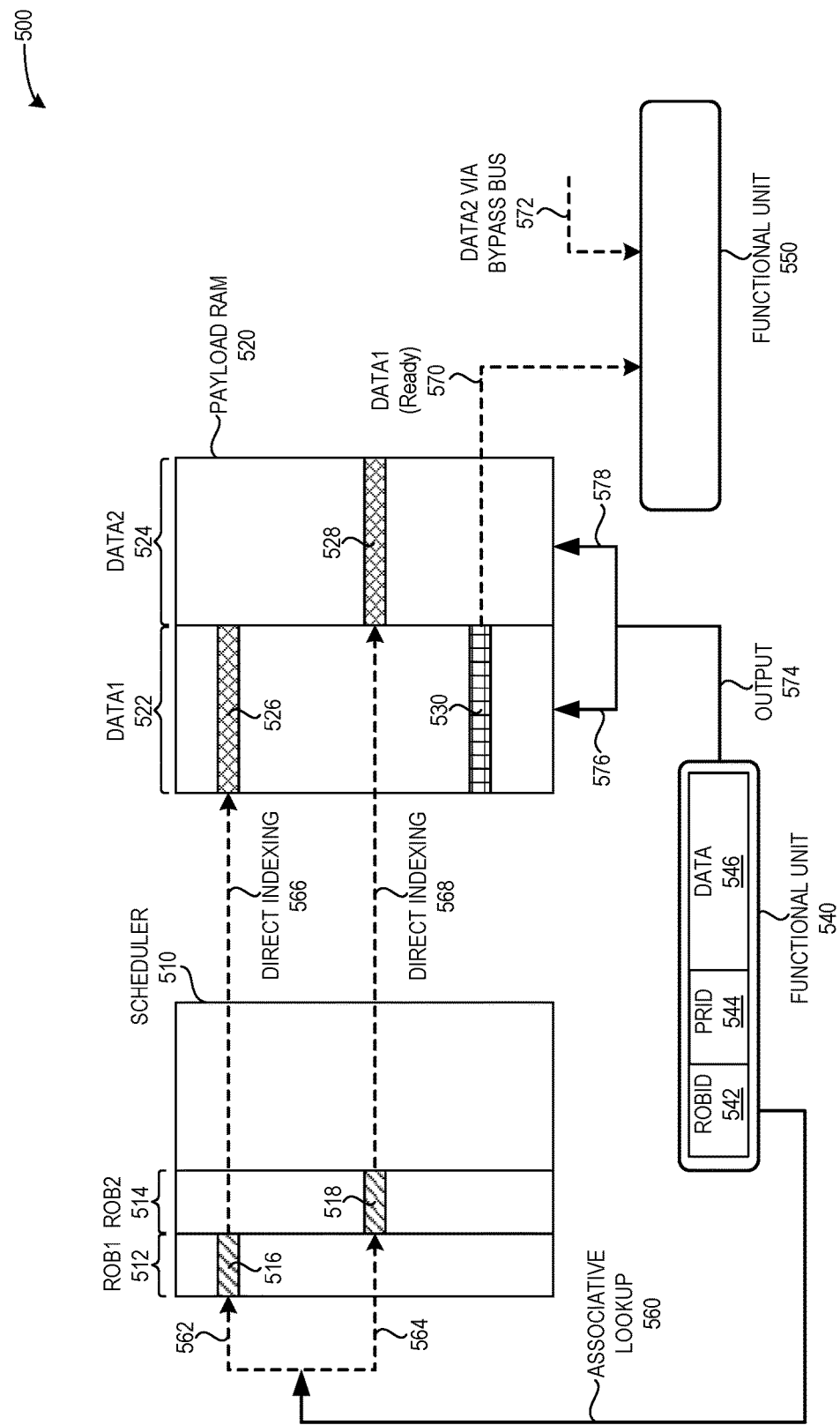
FIG. 5 illustrates a diagram of data writeback and bypassing involving payload random access memory (RAM), in accordance with an aspect of the present application.

FIG. 5 illustrates a diagram 500 of data writeback and bypassing involving payload random access memory (RAM), in accordance with an aspect of the present application. Diagram 500 includes a scheduler 510, payload RAM 520, and functional units 540 and 550. Scheduler 510 can correspond to scheduler 330 of diagram 300, payload RAM 520 can correspond to payload RAM 350 of diagram 300, and functional units 540 and 550 can correspond to execution units 360 (including 362, 364, and 366) of diagram 300. Each functional unit can include, for a respective instruction, at least the ROB ID (542), the physical register ID (544), and data (546).

Payload RAM and Data Writeback. In architectures with a payload RAM, the data must be forwarded to the waiting consumers in the payload RAM in addition to the PRF. In the described aspects of SRR, this data forwarding can be performed as described below. The functional unit (540) can broadcast the ROB ID of the finished producer instruction on the scheduler (510). This ROB ID can be matched with the ROB IDs of both source operands of each scheduler entry using an associative lookup (560). The obtained matches can include, e.g., ROB1 512 of 516 and ROB2 514 of 518 via, respectively, associative lookup results 562 and 564. These obtained matches can both be used to set the corresponding ready bits of consumers in the scheduler and also to directly index the corresponding payload RAM entries, e.g., data1 522 of 526 and data2 524 of 528 via, respectively, direct indexing operations 566 and 568, to receive data from the functional unit on their write port. The direct indexing implies that no additional broadcast needs to be involved given the payload RAM is a RAM structure.

Payload RAM and Data Bypassing. The above-described scenario of data writeback can occur when the consumer instruction is not ready to execute. When the last operand becomes ready and the instruction is woken/selected for execution, the data is not written to the payload RAM and can instead be bypassed directly to the functional unit (e.g., as depicted by data2 via bypass bus 572 in diagram 500). In such instances, the payload RAM can provide one/some of the operands (e.g., as depicted by data1 522 of 530 which is sent via a data1 (ready) 570 communication), while the other(s) can be received from the bypass bus (e.g., as depicted by communication 572). This can be similar to conventional systems where one/some of the operands come from the register file while the other(s) can come from the bypass bus.

Writes to Payload RAM vs. Physical Register File. As described below, the writes to payload RAM (e.g., via output 574 and communications 576/578 to, respectively, data1 522 and data2 524) can be much fewer than to the PRF which is written for all (but those without a destination) committing instructions. This is because in many cases, the consumers are few and ready to execute, in which case data can be directly bypassed to their execution unit. In such cases, there may be no other waiting consumers that need data (determined from the ROB ID match in the scheduler), and thus the system can avoid the write to the payload RAM.

Improvements to Commit

In conventional systems, when an instruction commits, the physical register previously mapped to the instruction's logical register (indicated by Ppreg field 326) can be released and added to the free list (380) of physical registers. In the described aspects of SRR, the same mechanism can be followed if the Ppreg field of the committing instruction is not NULL (indicating the corresponding physical register was not early released). However, if the Ppreg field is NULL, the system can take no action in terms of releasing a physical register.

In addition to the actual instruction commit, SRR can provide another significant improvement in terms of when to commit an instruction. In conventional systems, an instruction is committed when it arrives at the head of the ROB and has finished execution. In the described aspects of SRR, an instruction within a window W can start committing when the instruction reaches the head of the ROB and when all other instructions in both that window W and the next window W+1 have finished execution. While this may contribute to an increased commit-related delay, the smaller window size can help to keep this penalty low. The number of unfinished instructions can be tracked using a counter per window ID that can be incremented upon instruction dispatch and decremented upon instruction completion. This tracking counter can ensure correct recovery from mis-speculation. Handling recovery from mis-speculation is described further below and in relation to FIG. 7D.

Changes to Pipeline Stages in SRR

Figure 4:
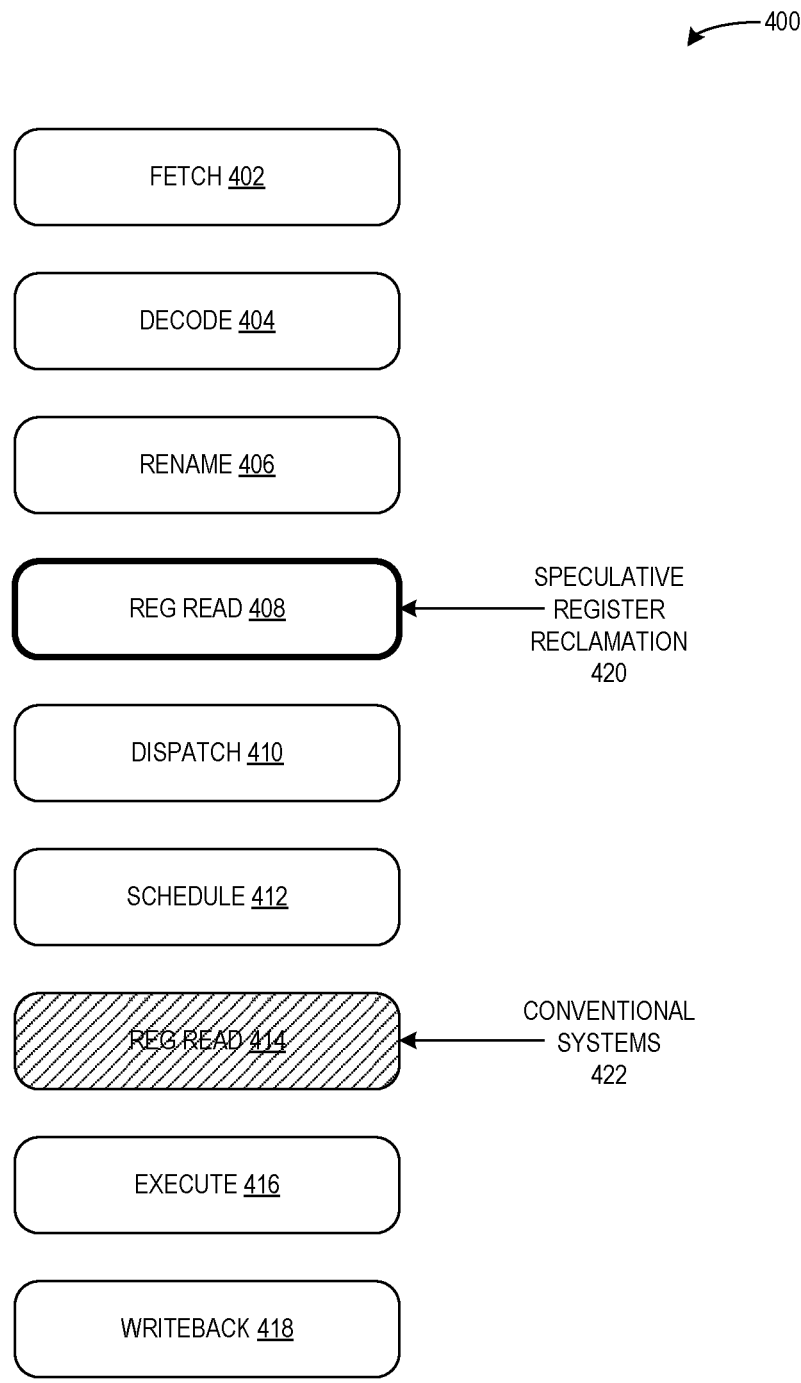
FIG. 4 illustrates a diagram of pipeline stages in handling instructions, including changes to the timing of the register read stage, in accordance with an aspect of the present application.

FIG. 4 illustrates a diagram 400 of pipeline stages in handling instructions, including changes to the timing of the register read stage, in accordance with an aspect of the present application. Diagram 400 illustrates that the conventional stages of operations may occur in the following order: a fetch stage 402; a decode stage 404; a rename stage 406; a dispatch stage 410; a schedule stage 412; a register read stage 414 (depicted with a right-slanting diagonal fill pattern); an execute stage 416; and a writeback stage 418. Thus, in conventional systems, the register read stage 414 occurs after the schedule stage 412 (as indicated by an arrow 422). In contrast, in the described aspects of SRR, the register read stage 408 (depicted with a bold border) occurs earlier in the pipeline: after the rename 406 stage (i.e., the "redefine" event) (as indicated by an arrow 420).

Recovery From Mis-Speculation

In conventional systems, when a branch outcome is mis-speculated, the instructions following the branch can be squashed and the instruction dispatch can resume from the correct branch target using the RAT saved at the branch apriori. Because no instructions following the incorrectly predicted branch are committed, the recovery can be correctly performed.

In the described aspects of SRR, in addition to instructions executed speculatively, physical registers are also freed speculatively. Because SRR can be a function of instruction behavior in the current and next window (e.g., where redefinition without use in the next window can free a register from the previous window), the instruction commit in window W can be halted until all instructions in both windows W and W+1 have finished execution. Also, if a branch in window W+1 mis-speculates, the progress must roll back to the beginning of window W. Similarly, if a branch in window W mis-speculates, the progress must roll back to beginning of window W−1. That is, the described aspects of SRR can roll back execution further behind the actual mis-predicted branch, which can lead to the overhead of re-issuing and re-executing instructions from the start of the previous window until the mis-predicted branch.

The recovery, however, can be similar in principle to conventional systems: because the window start is a branch, the instruction dispatch can resume using the RAT snapshot at that branch. SRR can also guarantee that no instructions following the start of the previous window are committed as in conventional systems. Because SRR does not release registers with cross-window uses, any physical registers used in window W−1 (assuming misprediction occurs within window W) that were written in previous windows can be guaranteed to be allocated, thus ensuring correct mis-speculation recovery. The registers that did not have cross-iteration uses in windows W−1 and W may have been early released but can be recomputed during re-execution. As part of this recovery, the newly issuing instructions can be assigned WIDs starting from the old WID of the instruction to which the execution rolls back.

Switching Between SRR and Normal Modes

Since the program counter (PC) moves to the beginning of the window previous to the culprit window (where the mis-speculation occurs), the number of instructions re-dispatched and re-executed can equal the size of a window plus the number of instructions from the start of the culprit window to the actual mis-speculated instruction. Because SRR naturally favors small windows (e.g., aligning windows to innermost loops) and also otherwise enforces upper limits on window size, the penalty from the above extraneous re-dispatch and re-execution may often be small. While this penalty may not be significant when compared to the hundreds of cycles of memory latency, this penalty can be quite significant for programs that enjoy L1/L2 cache hits (i.e., compute-bound) and contain frequent unpredictable branches (e.g., as in some SPECINT codes). However, it is these very compute-bound programs that do not benefit significantly from SRR, whereas the memory-bound programs do benefit significantly from SRR.

This characterization can result in a natural mode-switching strategy: enable SRR to benefit from aggressive register reclamation in the presence of memory-bound codes that stress the register file; and disable SRR for compute-bound codes with a high mis-prediction rate to resume normal mode execution (as in conventional systems) to minimize overhead. The described aspects can achieve this mode-switching strategy by tracking LLC Misses Per Kilo Instructions (MPKI), which is already supported in existing designs through performance counters. If this MPKI in a certain program region is below a first predetermined threshold combined with a high branch mis-prediction rate (e.g., above a second predetermined threshold), the system can disable SRR (i.e., "normal mode"); otherwise, the system can enable SRR (i.e., "SRR mode").

This switch between SRR mode and normal mode can be carried out by two simple functions. In the first function, in normal mode, all issuing instructions can set the H bit (i.e., set to a value of "1") in the RAT, which can disable the F bit in the ROB, which results in no register being early released. In SRR mode, all issuing instructions can always reset the H bit (i.e., set to a value of "0"), which can allow certain registers to be early released based on criteria discussed above. In the second function, in normal mode, the counters tracking the number of unfinished instructions per window are not updated and remain set to 0, which can allow the ROB to graduate instructions normally. In SRR mode, the counter can actually track the number of unfinished instructions in each window to restrict instruction graduation in order to enable mis-speculation recovery. These two functions can thus allow the described system to switch effectively between SRR mode and normal mode.

Improvements in Power Consumption and Performance Over Prior Approaches

As described herein, the aggressive speculative register reclamation using SRR can result in a reduction in the size of the physical register file. This reduction can result in an improved (i.e., reduced) power consumption, as accesses to the PRF may be less expensive (e.g., given a reduction of ~50% in the size of the PRF). SRR can also result in a significant reduction (e.g., ~80% on average) of the more expensive floating point (FP) register writes due to the early physical register reclamation. Furthermore, in SRR, the payload RAM may be written to less frequently because many instructions can receive their operands directly from the bypass bus, as described above in relation to FIG. 5. In addition, power consumption with SRR can be more evenly spread among the floating point register file, the payload RAM, and the load queue. Because the physical register file can be regarded as one of the hottest units on a chip, the described aspects of SRR, which can result in these improvements, can achieve a significant reduction in power consumption.

The described aspects of SRR can also result in performance improvements, e.g., by steering the power savings from a smaller physical register file towards other resources in the core. Improved performance from SRR can be a direct result of the reduced requirement of the physical registers themselves. Given a progressive reduction in physical registers, SRR can outperform CPR because SRR is more effective in releasing registers. That is, SRR can make the most of increased allocation of other resources at the expense of physical registers, while CPR cannot tolerate such a similar significant reduction in physical registers.

Thus, the described aspects can reduce the pressure on the physical register file in modern microarchitectures in the face of the large and ever-increasing number of in-flight instructions. SRR can leverage the property that logical registers used in a loop are often not used beyond the same loop iteration as their definition, so SRR can release the corresponding allocated physical register at the redefinition of the logical register, unlike at the graduation of the redefining instruction as in existing designs. SRR can also use the ROB IDs as tags for instruction wakeup in the scheduler and can employ a payload RAM to provide data to the functional units. As a result, SRR can release the physical registers of eligible instructions even prior to instruction completion. This can result in a significant saving of physical register lifetime, along with the reduced size of the physical register file and the consequential increase in power savings and performance.

Method for Facilitating Speculative Register Reclamation

Figure 6:
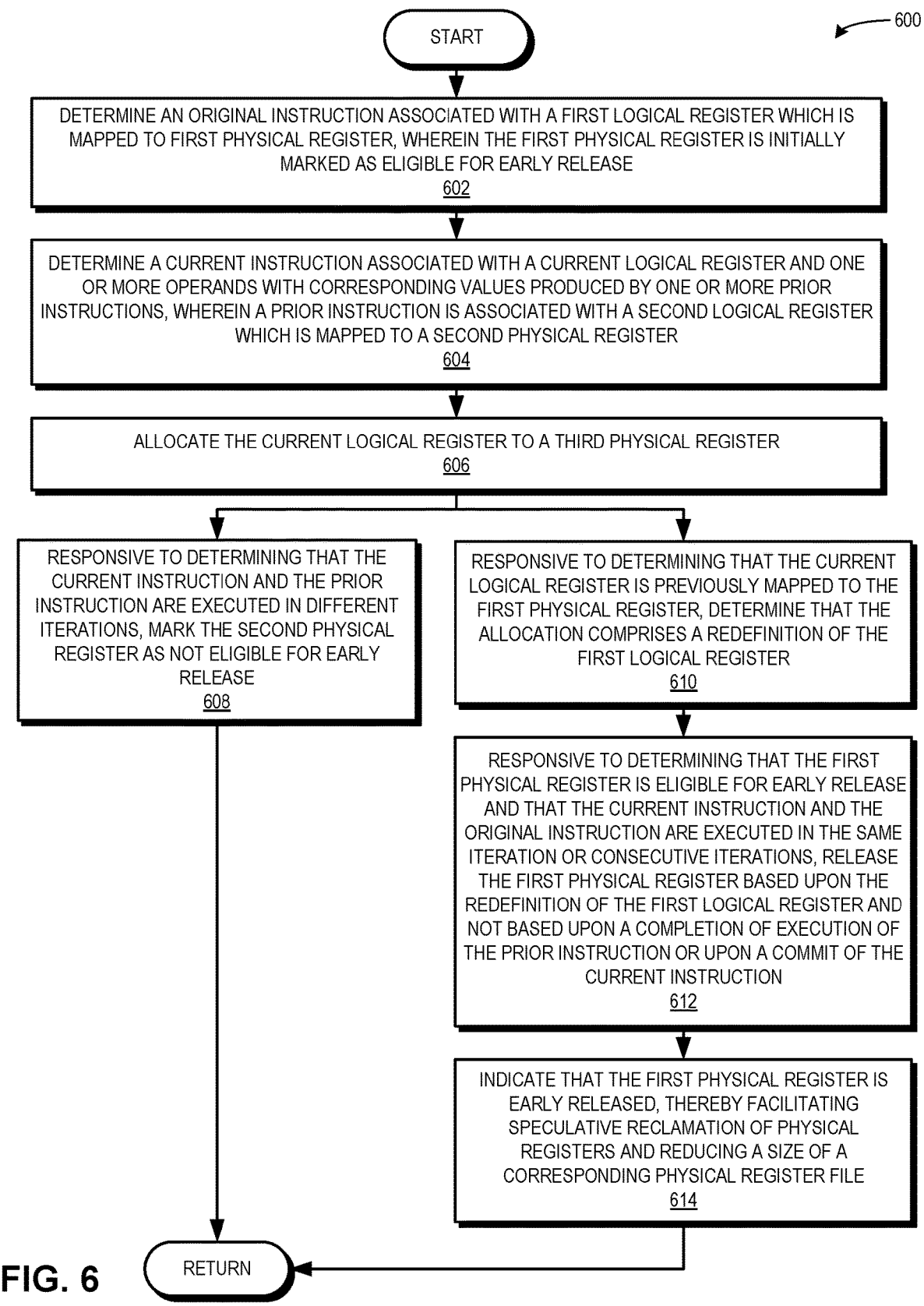
FIG. 6 presents a flowchart illustrating a method which facilitates speculative register reclamation, in accordance with an aspect of the present application.

FIG. 6A presents a flowchart 600 illustrating a method which facilitates speculative register reclamation, in accordance with an aspect of the present application. During operation, the system determines an original instruction associated with a first logical register which is mapped to a first physical register, wherein the first physical register is initially marked as eligible for early release (operation 602). The system determines a current instruction associated with a current logical register and one or more operands with corresponding values produced by one or more prior instructions, wherein a prior instruction is associated with a second logical register which is mapped to a second physical register (operation 604). The system allocates the current logical register to a third physical register (operation 606). Responsive to determining that the current instruction and the prior instruction are executed in different iterations, the system marks the second physical register as not eligible for early release (operation 608). The operation returns and can also continue at operation 610.

Responsive to determining that the current logical register is previously mapped to the first physical register, the system determines that the allocation comprises a redefinition of the first logical register (operation 610). Responsive to determining that the first physical register is eligible for early release and that the current instruction and the original instruction are executed in the same iteration or consecutive iterations, the system releases the first physical register based upon the redefinition of the first logical register and not based upon a completion of execution of the prior instruction or upon a commit of the current instruction (operation 612). The system indicates that the first physical register is early released, thereby facilitating speculative reclamation of physical registers and reducing a size of a corresponding physical register file (operation 614).

The operations described below in relation to FIGS. 7A-7E correspond to the described aspects of the design of SRR, including the sections relating to FIG. 3-4, RAT 310, ROB 320, scheduler 330, payload RAM 350, execution units 360, PRF 370, and free list 380 as well as the sections relating to FIG. 5, scheduler 510, payload RAM 520, and functional units 540/550.

Figure 7A:
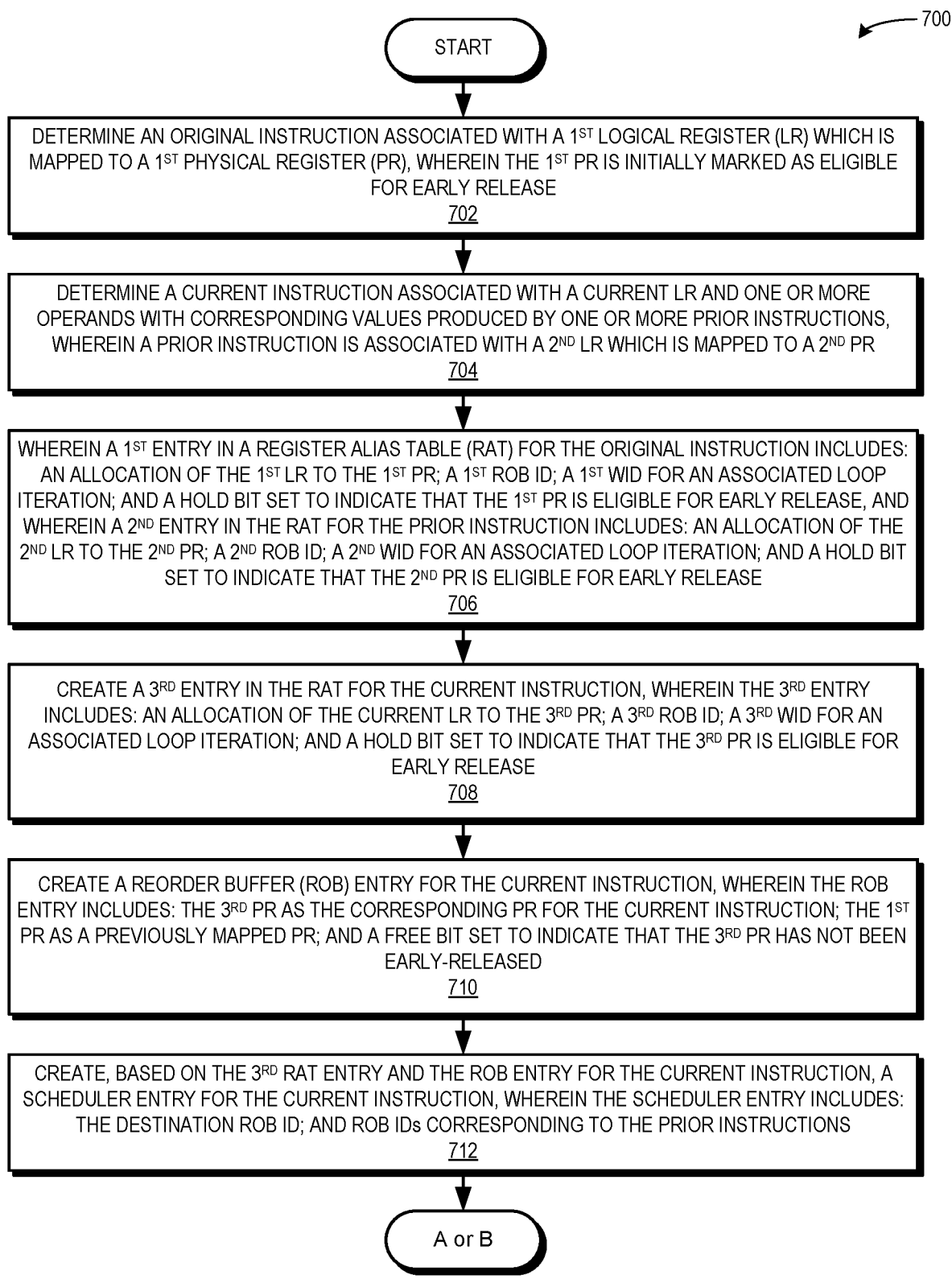
FIGS. 7A, 7B, 7C, 7D, and 7E present flowcharts illustrating a method which facilitates speculative register reclamation, in accordance with an aspect of the present application.

FIG. 7A presents a flowchart 700 illustrating a method which facilitates speculative register reclamation, in accordance with an aspect of the present application. During operation, the system determines an original instruction associated with a first logical register which is mapped to a first physical register, wherein the first physical register is initially marked as eligible for early release (operation 702). The system determines a current instruction associated with a current logical register and one or more operands with corresponding values produced by one or more prior instructions, wherein a prior instruction is associated with a second logical register which is mapped to a second physical register (operation 704). A first entry in a RAT for the original instruction includes: an allocation of the first LR to the first PR; a first ROB ID; a first window ID (WID) for an associated loop iteration; and a hold bit set to indicate that the first PR is eligible for early release; and a second entry in the RAT for the prior instruction includes: an allocation of the second LR to the second PR; a second ROB ID; a second WID for an associated loop iteration; and a hold bit set to indicate that the second PR is eligible for early release (operation 706). The system creates a third entry in the RAT for the current instruction, wherein the third entry includes: an allocation of the current LR to the third PR; a third ROB ID; a third WID for an associated loop iteration; and a hold bit set to indicate that the third PR is eligible for early release (operation 708). The system creates a reorder buffer (ROB) entry for the current instruction, wherein the ROB entry includes: the third PR as the corresponding PR for the current instruction; the first PR as a previously mapped PR; and a free bit set to indicate that the third PR has not been early-released (operation 710). The system creates, based on the third RAT entry and the ROB entry for the current instruction, a scheduler entry for the current instruction, wherein the scheduler entry includes: the destination ROB ID; and ROB IDs corresponding to the prior instructions (operation 712). The operation continues at Label A of FIG. 7B and/or Label B of FIG. 7C.

Figure 7B:
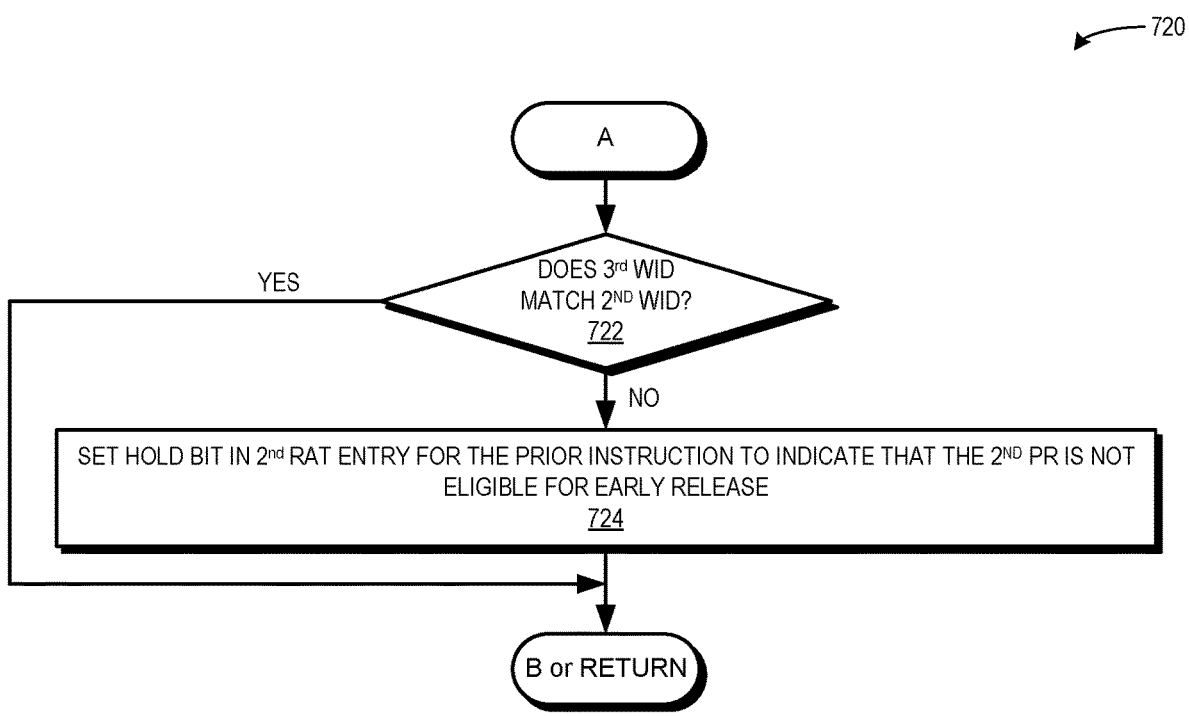

FIG. 7B presents a flowchart 720 illustrating a method which facilitates speculative register reclamation, in accordance with an aspect of the present application. The system determines whether the third WID matches the second WID (decision 722). If the third WID does not match the second WID (decision 722), the system sets the hold bit in the second RAT entry for the prior instruction to indicate that the second physical register is not eligible for early release (operation 724). If the third WID does match the second WID (decision 722), the operation continues at Label B or returns.

Figure 7C:
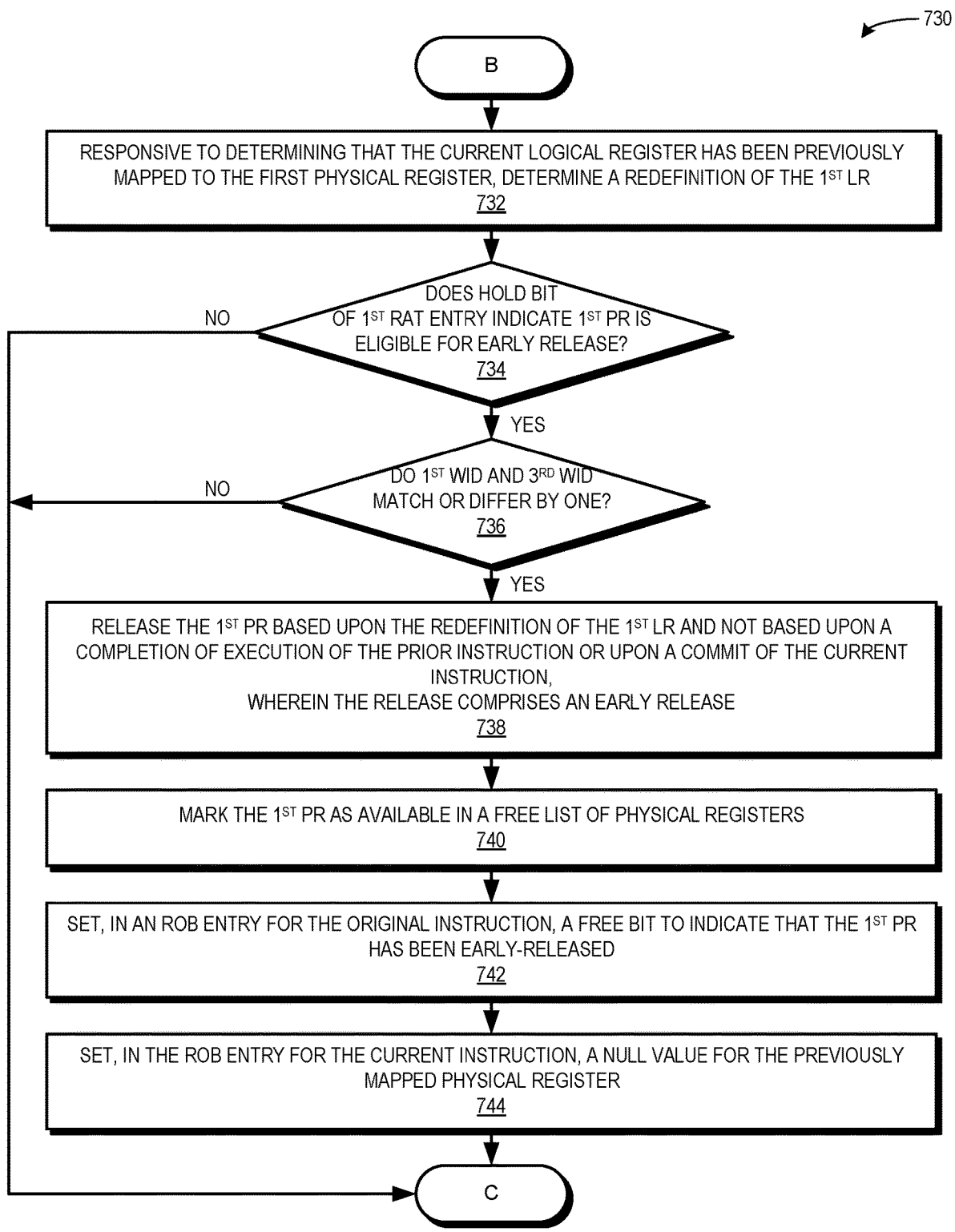

FIG. 7C presents a flowchart 730 illustrating a method which facilitates speculative register reclamation, in accordance with an aspect of the present application. Responsive to determining that the current logical register is previously mapped to the first physical register, the system determines a redefinition of the first logical register (operation 732). If the hold bit of the first RAT entry indicates that the first physical register is eligible for early release (decision 734) and the first WID and the third WID match or differ by one (decision 736), the system releases the first physical register based upon the redefinition of the first logical register and not based upon a completion of execution of the prior instruction or upon the commit of the current instruction, wherein the release comprises an early release (operation 738). The system marks the first physical register as available in a free list of physical registers (operation 740). The system sets, in an ROB entry for the original instruction, a free bit to indicate that the first physical register has been early-released (operation 742). The system sets, in the ROB entry for the current instruction, a null value for the previously mapped physical register (operation 744). The operation continues at Label C of FIG. 7D.

Figure 7D:
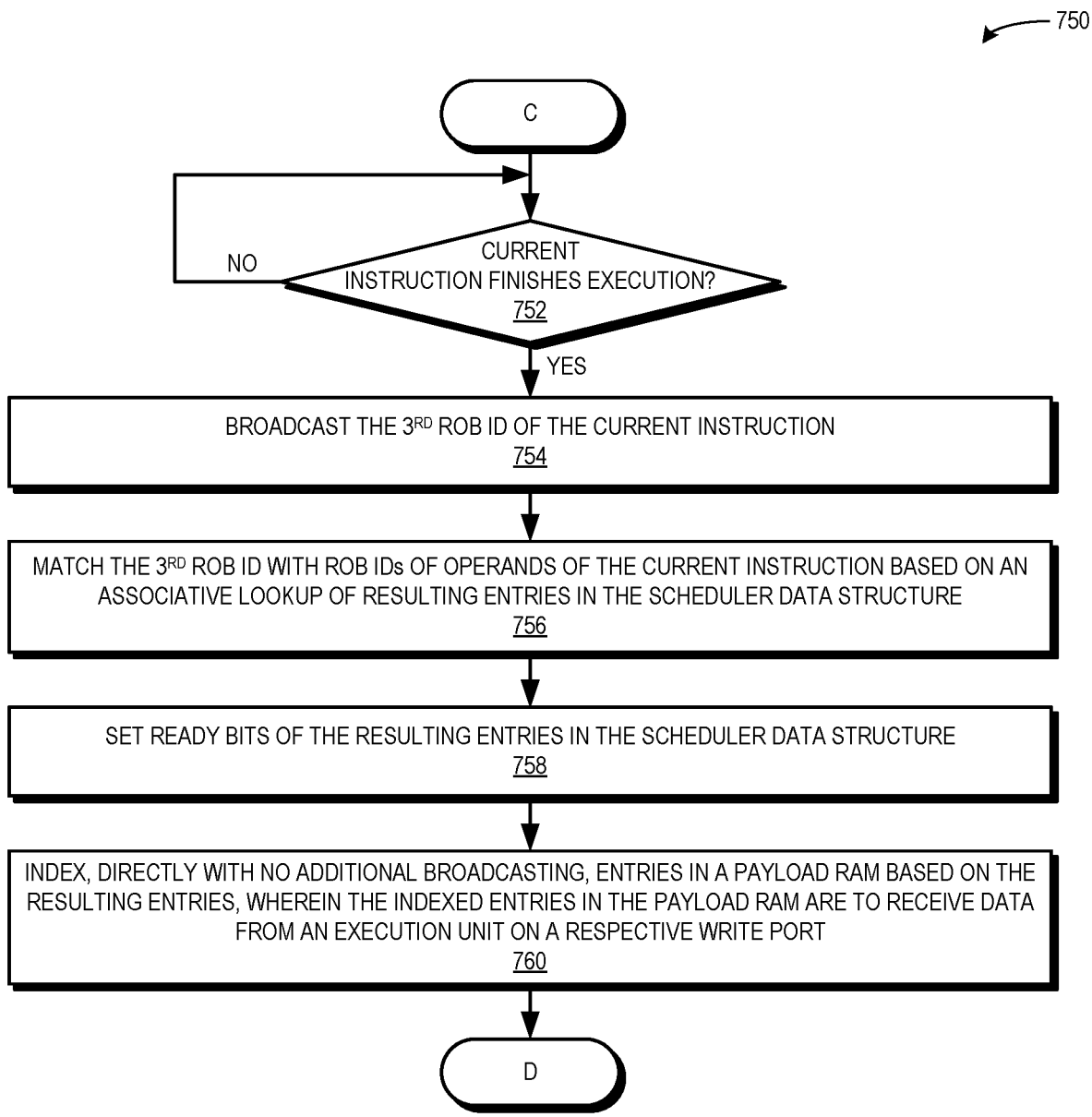

If the hold bit of the first RAT entry does not indicate that the first physical register is eligible for early release (decision 734) or if the hold bit does indicate eligibility for early release (decision 734) but the first WID and the third WID do not match or differ by one (decision 736), the operation continues at Label C of FIG. 7D.

FIG. 7D presents a flowchart 750 illustrating a method which facilitates speculative register reclamation, in accordance with an aspect of the present application. If the current instruction does not finish execution (decision 752), the operation continues until it does. If the current instruction does finish execution (decision 752), the system broadcasts the third ROB ID of the current instruction (operation 754). The system matches the third ROB ID with ROB IDs of operands of the current instruction based on an associative lookup of resulting entries in the scheduler data structure (operation 756). The system sets ready bits of the resulting entries in the scheduler data structure (operation 758). The system indexes, directly with no additional broadcasting, entries in a payload RAM based on the resulting entries, wherein the indexed entries in the payload RAM are to receive data from an execution unit on a respective write port (operation 760). The execution unit can receive a value associated with a first operand of the current instruction from the payload RAM and can further receive a value associated with a second operand of the current instruction via a bypass bus (not shown). The operation continues at Label D of FIG. 7E.

Figure 7E:
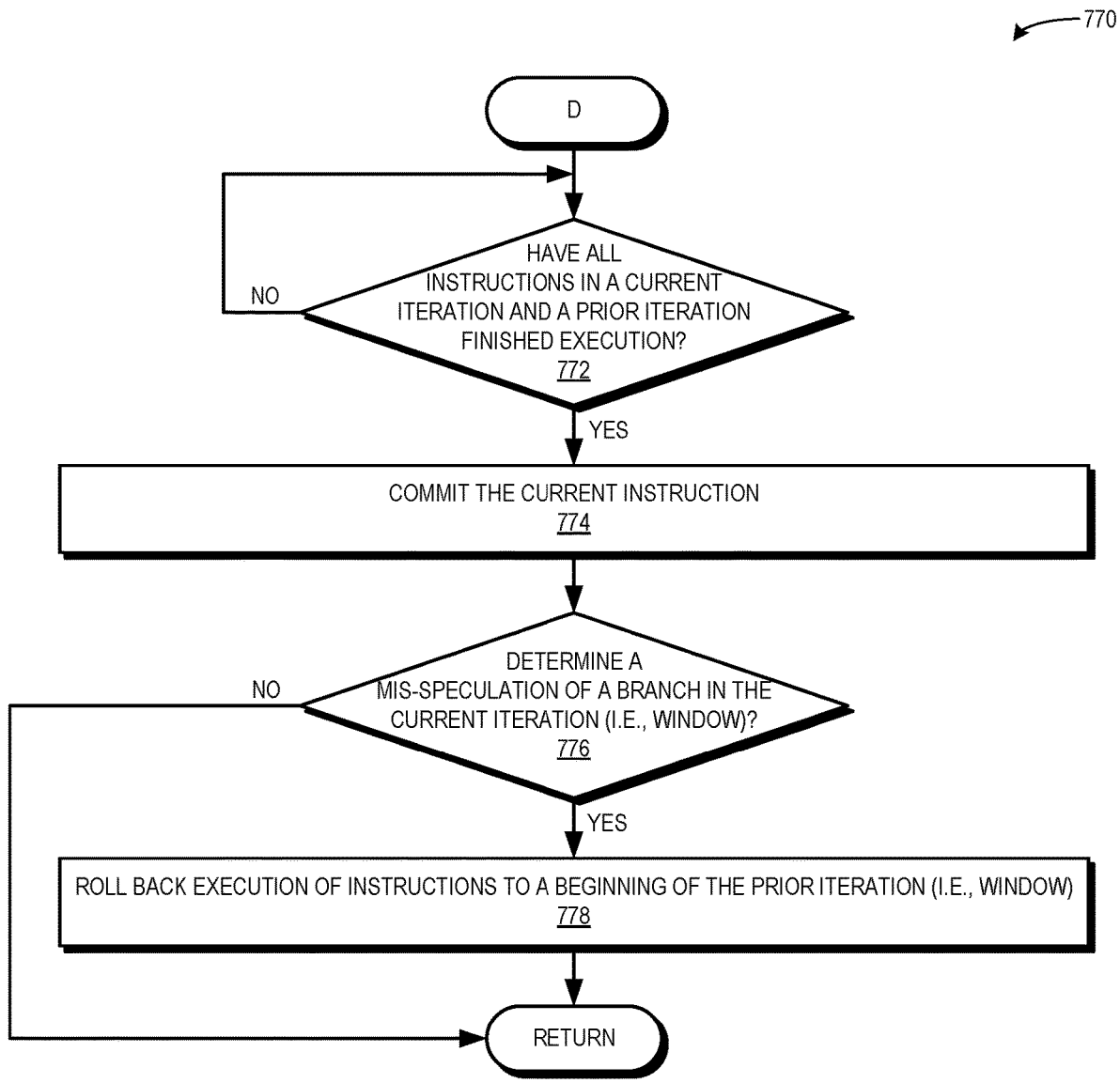

FIG. 7E presents a flowchart 770 illustrating a method which facilitates speculative register reclamation, in accordance with an aspect of the present application. The system determines if all instructions in a current iteration (e.g., window W) and a prior iteration (e.g., window W−1) have finished execution (decision 772). If not, the operation continues until they do finish execution. If the instructions in the current and prior iterations have finished execution (decision 772), the system commits the current instruction (operation 774). If the system does not determine a mis-speculation of a branch in the current iteration (i.e., window W) (decision 776), the operation returns. If the system does determine a mis-speculation of a branch in the current iteration (i.e., the current window W) (decision 776), the system rolls back execution of instructions to a beginning of the prior iteration (i.e., the prior window W−1) (operation 778). The operation returns. While decision 776 and operation 778 are depicted in FIG. 7D as occurring after operation 774, the logic for handling mis-speculation and rollback can occur at other times during the processing of the current instruction or any other instruction.

Computer System for Facilitating Speculative Register Reclamation

Figure 8:
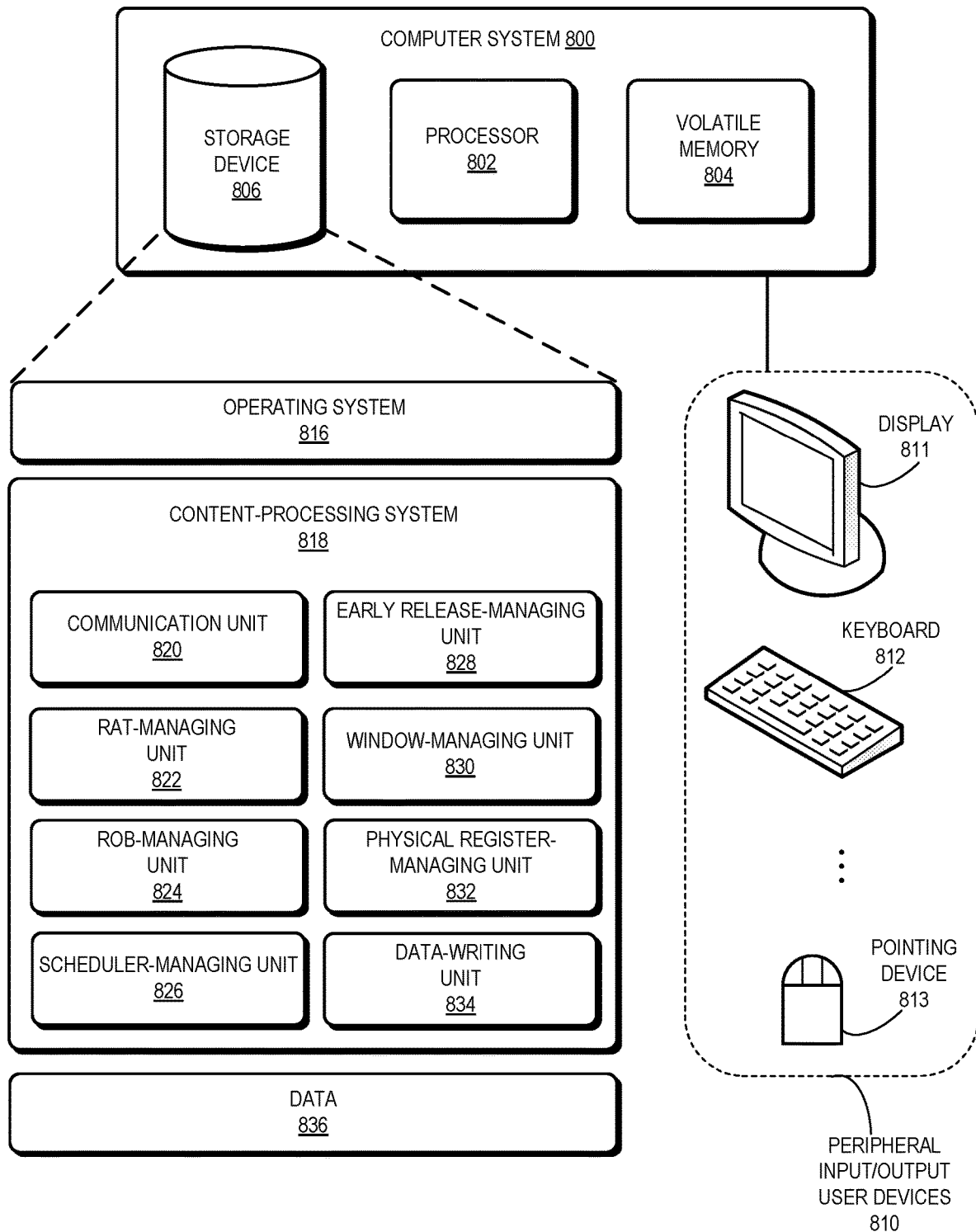
FIG. 8 illustrates a computer system which facilitates speculative register reclamation, in accordance with an aspect of the present application.

FIG. 8 illustrates a computer system 800 which facilitates speculative register reclamation, in accordance with an aspect of the present application. Computer system 800 includes a processor 802, a memory 804, and a storage device 806. Memory 804 can include a volatile memory (e.g., RAM) that serves as a managed memory, and can be used to store one or more memory pools. Furthermore, computer system 800 can be coupled to peripheral input/output (I/O) user devices 810 (e.g., a display device 811, a keyboard 812, and a pointing device 813). Storage device 806 can store an operating system 816, a content-processing system 818, and data 836.

Content-processing system 818 can include instructions, which when executed by computer system 800, can cause computer system 800 to perform methods and/or processes described in this disclosure. Specifically, content-processing system 820 may include instructions for sending and/or receiving data to/from other modules/units/components within computer system 800 or to/from other network nodes across a computer network (communication unit 820).

Content-processing system 818 can further include instructions for determining a current instruction associated with a logical register and one or more operands with corresponding values produced by one or more prior instructions (communication unit 820). Content-processing system 818 can include instructions for allocating the logical register to a first physical register, wherein the first physical register is initially marked as eligible for early release (RAT-managing unit 522). Content-processing system 818 can include instructions for, responsive to the logical register being previously mapped to an original physical register, determining that the allocation comprises a redefinition of the logical register (RAT-managing unit 822). Content-processing system 818 can include instructions for, responsive to the current instruction not being executed in a same iteration as a prior instruction (window-managing unit 830), marking the original physical register as not eligible for early release (early release-managing unit 828). Content-processing system 818 can include instructions for, responsive to determining that the first physical register is eligible for early release (early release-managing unit 828) and that the current instruction and the prior instruction are executed in the same or in consecutive iterations (window-managing unit 830), releasing the original physical register based upon the redefinition of the logical register and not based upon a completion of execution of the prior instruction or upon a commit of the current instruction (physical register-managing unit 832). Content-processing system 818 can include instructions for indicating that the original physical register is early released, thereby facilitating speculative reclamation of physical registers and reducing a size of a corresponding physical register file (early release-managing unit 828 and physical register-managing unit 832).

Content-processing system 818 can include instructions for creating and managing RAT entries (RAT-managing unit 822), ROB entries (ROB-managing unit 824), and managing scheduler entries (scheduler-managing unit 826), as described above in relation to FIGS. 3, 5, 6, and 7A-7E. Content-processing system 818 can also include instructions for writing data to/from a payload RAM and to a physical register file (data-writing unit 834).

Data 836 can include any data that is required as input or that is generated as output by the methods and/or processes described in this disclosure. Specifically, data 836 can store at least: data; an instruction; an operand value; a RAT; a RAT entry; a logical register or logical register ID; a physical register or physical register ID; a pending indicator; a ROB ID; a window ID; a hold bit; a ROB; busy bits; state bits; a previous physical register mapped to a logical register; a free bit; a scheduler data structure; a scheduler entry; a busy indicator; an operation code or information; ready bits; a destination indicator; a destination ROB ID; a ROB ID for a source operand or corresponding to a prior instruction; entries obtained based on an associative lookup; entries in a RAM designated to store payload data; entries obtained based on direct indexing of a payload RAM; an indication of finishing a stage of execution for an instruction, including "define," "re-define," "finishEx," and "commit"; an indication of a current, prior, or consecutively subsequent loop, iteration, loop iteration, or window; and an indicator of a mis-speculation and a corresponding branch.

In general, the disclosed aspects provide a method, computer system, and non-transitory computer-readable storage medium for facilitating speculative register reclamation. In one aspect, the system determines an original instruction associated with a first logical register which is mapped to a first physical register, wherein the first physical register is initially marked as eligible for early release. The system determines a current instruction associated with a current logical register and one or more operands with corresponding values produced by one or more prior instructions, wherein a prior instruction is associated with a second logical register which is mapped to a second physical register. The system allocates the current logical register to a third physical register. Responsive to determining that the current instruction and the prior instruction are executed in different iterations, the system marks the second physical register as not eligible for early release. Responsive to determining that the current logical register is previously mapped to the first physical register, the system determines that the allocation comprises a redefinition of the first logical register. Responsive to determining that the first physical register is eligible for early release and that the current instruction and the original instruction are executed in the same iteration or consecutive iterations, the system releases the first physical register based upon the redefinition of the first logical register and not based upon a completion of execution of the prior instruction or upon a commit of the current instruction. The system indicates that the first physical register is early released, thereby facilitating speculative reclamation of physical registers and reducing a size of a corresponding physical register file.

In a variation on this aspect, a first entry in a register alias table (RAT) for the original instruction includes: an allocation of the first logical register to the first physical register; a first ROB ID; a first window ID for an associated loop iteration; and a hold bit set to indicate that the first PR is eligible for early release. A second entry in the RAT for the prior instruction includes: an allocation of the second logical register to the second physical register; a second ROB ID; a second window ID for an associated loop iteration; and a hold bit set to indicate that the second physical register is eligible for early release. The system creates a third entry in the RAT for the current instruction, wherein the third entry includes: an allocation of the current logical register to the third physical register; a third ROB ID; a third window ID for an associated loop iteration; and a hold bit set to indicate that the third physical register is eligible for early release. The system creates a reorder buffer (ROB) entry for the current instruction, wherein the ROB entry includes: the third physical register as the corresponding physical register for the current instruction; the first physical register as a previously mapped physical register; and a free bit set to indicate that the third physical register has not been early-released. The system creates, based on the third RAT entry and the ROB entry for the current instruction, a scheduler entry for the current instruction, wherein the scheduler entry includes: the destination ROB ID; and ROB IDs corresponding to the prior instructions.

In a further variation on this aspect, the system determines that the current instruction is not being executed in the same iteration as the prior instruction, which comprises determining that the third window ID of the current instruction does not match the second window ID of the prior instruction. Marking the second physical register as not eligible for early release comprises setting a hold bit in the second RAT entry for the prior instruction to indicate that the second physical register is not eligible for early release.

In a further variation, the system determines that the first physical register is eligible for early release, which comprises determining that the hold bit of the first RAT entry indicates that the first physical register is eligible for early release. The system determines that the original instruction and the current instruction are executed in the same or in consecutive iterations, which comprises determining that the first window ID for the original instruction and the third window ID for the current instruction match or differ by one. Releasing the first physical register based upon the redefinition of the first logical register and not based upon the completion of execution of the prior instruction or upon the commit of the current instruction comprises an early release. The system sets, in an ROB entry for the original instruction, a free bit to indicate that the first physical register has been early-released. The system sets, in the ROB entry for the current instruction, a null value for the previously mapped physical register.

In a further variation, setting the free bit in the ROB entry for the original instruction is based on a status of a pending bit for the original instruction.

In a further variation, a size of a respective window identified by a respective window ID corresponding to a respective loop iteration is based on at least one of: a number of instructions in the respective loop iteration; a predetermined lower limit for a number of instructions corresponding to the respective window size; and a predetermined upper limit for the number of instructions corresponding to the respective window size.

In a further variation, responsive to determining that the first physical register is released: the system writes results of the current instruction to a random access memory (RAM) designated to store payload data; and the system refrains from writing the results to a physical register file.

In a further variation, responsive to the current instruction finishing execution, the system broadcasts the third ROB ID of the current instruction. The system matches the third ROB ID with ROB IDs of operands of the current instruction based on an associative lookup of resulting entries in the scheduler data structure. The system sets ready bits of the resulting entries in the scheduler data structure. The system indexes, directly with no additional broadcasting, entries in the payload RAM based on the resulting entries, wherein the indexed entries in the payload RAM are to receive data from an execution unit on a respective write port.

In a further variation, the execution unit receives a value associated with a first operand of the current instruction from the payload RAM and further receives a value associated with a second operand of the current instruction via a bypass bus.

In a further variation, the system commits the current instruction in response to determining that all instructions in a current iteration and a prior iteration have finished execution, wherein a respective iteration corresponds to a respective window of instructions. Responsive to determining that a branch in the current window mis-speculates, the system rolls back to a beginning of the prior window, thereby facilitating correct recovery from the mis-speculation.

In a further variation, responsive to detecting a first condition which comprises a misses per kilo instructions (MPKI) counter below a first predetermined threshold and a branch mis-prediction rate above a second predetermined threshold, the system switches from a speculative register reclamation (SRR) mode to a normal mode, wherein all issuing instructions set, in a corresponding respective RAT entry, a hold bit to indicate that a corresponding physical register is not eligible for early release, and wherein counters tracking a number of unfinished instructions per window are not updated. Responsive to detecting the first condition no longer exists, the system switches from the normal mode to the SRR mode, wherein all issuing instructions set, in the corresponding respective RAT entry, the hold bit to indicate that the corresponding physical register is eligible for early release, and wherein counters tracking a number of unfinished instructions per window are updated.

In another aspect, a non-transitory computer-readable storage medium stores instructions that when executed by a computer cause the computer to perform the method described above, including in relation to FIGS. 3, 4, 5, 6, and 7A-7E. In addition, the method can include the following operations: switching from a speculative register reclamation (SRR) mode to a normal mode based on a misses per kilo instructions (MPKI) counter falling below a first predetermined threshold and a branch mis-prediction rate falling above a second predetermined threshold, wherein in the normal mode, all allocated physical registers are initially marked as not eligible for early release; and switching from the normal mode to the SRR mode based on the MPKI counter no longer falling below the first predetermined threshold and the branch mis-prediction rate no longer falling above the second predetermined threshold, wherein in the SRR mode, all allocated physical registers are initially marked as eligible for early release.

In yet another aspect, a computer system comprises a processor and a storage device which stores instructions that when executed by the processor cause the processor to perform the method as described above, including in relation to FIGS. 3, 4, 5, 6, and 7A-7E. The method can also include the following operations: determining a current instruction associated with a logical register and one or more operands with corresponding values produced by one or more prior instructions; allocating the logical register to a first physical register, wherein the first physical register is initially marked as eligible for early release and wherein the logical register is previously mapped to an original physical register; determining that the first physical register is eligible for early release; determining that the current instruction and the prior instruction are executed in the same or in consecutive iterations; and releasing the original physical register upon a redefinition of the logical register, thereby facilitating a reduction in a size of a corresponding physical register file.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method comprising:
   determining an original instruction associated with a first logical register which is mapped to a first physical register, wherein the first physical register is initially marked as eligible for early release;
   determining a current instruction associated with a current logical register and one or more operands with corresponding values produced by one or more prior instructions, wherein a prior instruction is associated with a second logical register which is mapped to a second physical register;
   allocating the current logical register to a third physical register;
   responsive to determining that the current instruction and the prior instruction are executed in different iterations, marking the second physical register as not eligible for early release;
   responsive to determining that the current logical register is previously mapped to the first physical register, determining that the allocation comprises a redefinition of the first logical register;
   responsive to determining that the first physical register is eligible for early release and that the current instruction and the original instruction are executed in the same iteration or consecutive iterations, releasing the first physical register based upon the redefinition of the first logical register, irrespective of whether the prior instruction has completed execution or the current instruction has been committed; and
   indicating that the first physical register is early released, thereby facilitating speculative reclamation of physical registers and reducing a size of a corresponding physical register file.

2. The method of claim 1,
   wherein a first entry in a register alias table (RAT) for the original instruction includes: an allocation of the first logical register to the first physical register; a first ROB ID; a first window ID for an associated loop iteration; and a hold bit set to indicate that the first PR is eligible for early release; and
   wherein a second entry in the RAT for the prior instruction includes: an allocation of the second logical register to the second physical register; a second ROB ID; a second window ID for an associated loop iteration; and a hold bit set to indicate that the second physical register is eligible for early release,
   and wherein the method further comprises:
   creating a third entry in the RAT for the current instruction, wherein the third entry includes: an allocation of the current logical register to the third physical register; a third ROB ID; a third window ID for an associated loop iteration; and a hold bit set to indicate that the third physical register is eligible for early release;
   creating a reorder buffer (ROB) entry for the current instruction, wherein the ROB entry includes: the third physical register as the corresponding physical register for the current instruction; the first physical register as a previously mapped physical register; and a free bit set to indicate that the third physical register has not been early-released; and
   creating, based on the third RAT entry and the ROB entry for the current instruction, a scheduler entry for the current instruction, wherein the scheduler entry includes: the destination ROB ID; and ROB IDs corresponding to the prior instructions.

3. The method of claim 2, further comprising:
   determining that the current instruction is not being executed in the same iteration as the prior instruction, which comprises determining that the third window ID of the current instruction does not match the second window ID of the prior instruction,
   wherein marking the second physical register as not eligible for early release comprises setting a hold bit in the second RAT entry for the prior instruction to indicate that the second physical register is not eligible for early release.

4. The method of claim 3, further comprising:
   determining that the first physical register is eligible for early release, which comprises determining that the hold bit of the first RAT entry indicates that the first physical register is eligible for early release;
   determining that the original instruction and the current instruction are executed in the same or in consecutive iterations, which comprises determining that the first window ID for the original instruction and the third window ID for the current instruction match or differ by one,
   wherein releasing the first physical register based upon the redefinition of the first logical register and not based upon the completion of execution of the prior instruction or upon the commit of the current instruction comprises an early release;
   setting, in an ROB entry for the original instruction, a free bit to indicate that the first physical register has been early-released; and
   setting, in the ROB entry for the current instruction, a null value for the previously mapped physical register.

5. The method of claim 4,
   wherein setting the free bit in the ROB entry for the original instruction is based on a status of a pending bit for the original instruction.

6. The method of claim 2,
   wherein a size of a respective window identified by a respective window ID corresponding to a respective loop iteration is based on at least one of:
   a number of instructions in the respective loop iteration;
   a predetermined lower limit for a number of instructions corresponding to the respective window size; and
   a predetermined upper limit for the number of instructions corresponding to the respective window size.

7. The method of claim 2, further comprising:
   responsive to determining that the first physical register is released:
   writing results of the current instruction to a random access memory (RAM) designated to store payload data; and refraining from writing the results to a physical register file.

8. The method of claim 7, further comprising:
responsive to the current instruction finishing execution, broadcasting the third ROB ID of the current instruction;
matching the third ROB ID with ROB IDs of operands of the current instruction based on an associative lookup of resulting entries in the scheduler data structure;
setting ready bits of the resulting entries in the scheduler data structure; and
indexing, directly with no additional broadcasting, entries in the payload RAM based on the resulting entries, wherein the indexed entries in the payload RAM are to receive data from an execution unit on a respective write port.

9. The method of claim 8,
wherein the execution unit receives a value associated with a first operand of the current instruction from the payload RAM and further receives a value associated with a second operand of the current instruction via a bypass bus.

10. The method of claim 1, further comprising:
committing the current instruction in response to determining that all instructions in a current iteration and a prior iteration have finished execution, wherein a respective iteration corresponds to a respective window of instructions; and
responsive to determining that a branch in the current window mis-speculates, rolling back to a beginning of the prior window,
thereby facilitating correct recovery from the mis-speculation.

11. The method of claim 2, further comprising:
responsive to detecting a first condition which comprises a misses per kilo instructions (MPKI) counter below a first predetermined threshold and a branch mis-prediction rate above a second predetermined threshold:
switching from a speculative register reclamation (SRR) mode to a normal mode,
wherein all issuing instructions set, in a corresponding respective RAT entry, a hold bit to indicate that a corresponding physical register is not eligible for early release, and
wherein counters tracking a number of unfinished instructions per window are not updated; and
responsive to detecting the first condition no longer exists:
switching from the normal mode to the SRR mode,
wherein all issuing instructions set, in the corresponding respective RAT entry, the hold bit to indicate that the corresponding physical register is eligible for early release, and
wherein counters tracking a number of unfinished instructions per window are updated.

12. A non-transitory computer-readable storage medium storing instructions that when executed by a computer cause the computer to perform a method, the method comprising:
determining an original instruction associated with a first logical register which is mapped to a first physical register, wherein the first physical register is initially marked as eligible for early release;
determining a current instruction associated with a current logical register and one or more operands with corresponding values produced by one or more prior instructions, wherein a prior instruction is associated with a second logical register which is mapped to a second physical register;
allocating the current logical register to a third physical register;
responsive to determining that the current instruction and the prior instruction are executed in different iterations, marking the second physical register as not eligible for early release;
responsive to determining that the current logical register is previously mapped to the first physical register, determining that the allocation comprises a redefinition of the first logical register;
responsive to determining that the first physical register is eligible for early release and that the current instruction and the original instruction are executed in the same iteration or consecutive iterations, releasing the first physical register based upon the redefinition of the first logical register, irrespective of whether the prior instruction has completed execution or the current instruction has been committed; and
indicating that the first physical register is early released, thereby facilitating speculative reclamation of physical registers and reducing a size of a corresponding physical register file.

13. The non-transitory computer-readable storage medium of claim 12, wherein the method further comprises:
wherein a first entry in a register alias table (RAT) for the original instruction includes: an allocation of the first logical register to the first physical register; a first ROB ID; a first window ID for an associated loop iteration; and a hold bit set to indicate that the first PR is eligible for early release; and
wherein a second entry in the RAT for the prior instruction includes: an allocation of the second logical register to the second physical register; a second ROB ID; a second window ID for an associated loop iteration; and a hold bit set to indicate that the second physical register is eligible for early release,
and wherein the method further comprises:
creating a third entry in the RAT for the current instruction, wherein the third entry includes: an allocation of the current logical register to the third physical register; a third ROB ID; a third window ID for an associated loop iteration; and a hold bit set to indicate that the third physical register is eligible for early release;
creating a reorder buffer (ROB) entry for the current instruction, wherein the ROB entry includes: the third physical register as the corresponding physical register for the current instruction; the first physical register as a previously mapped physical register; and a free bit set to indicate that the third physical register has not been early-released; and
creating, based on the third RAT entry and the ROB entry for the current instruction, a scheduler entry for the current instruction, wherein the scheduler entry includes: the destination ROB ID; and ROB IDs corresponding to the prior instructions.

14. The non-transitory computer-readable storage medium of claim 13, wherein the method further comprises:
determining that the current instruction is not being executed in the same iteration as the prior instruction, which comprises determining that the third window ID of the current instruction does not match the second window ID of the prior instruction,
wherein marking the second physical register as not eligible for early release comprises setting a hold bit in the second RAT entry for the prior instruction to indicate that the second physical register is not eligible for early release.

15. The non-transitory computer-readable storage medium of claim 14, wherein the method further comprises:
determining that the first physical register is eligible for early release, which comprises determining that the hold bit of the first RAT entry indicates that the first physical register is eligible for early release;
determining that the original instruction and the current instruction are executed in the same or in consecutive iterations, which comprises determining that the first window ID for the original instruction and the third window ID for the current instruction match or differ by one,
wherein releasing the first physical register based upon the redefinition of the first logical register and not based upon the completion of execution of the prior instruction or upon the commit of the current instruction comprises an early release;
setting, in an ROB entry for the original instruction, a free bit to indicate that the first physical register has been early-released; and
setting, in the ROB entry for the current instruction, a null value for the previously mapped physical register.

16. The non-transitory computer-readable storage medium of claim 13, wherein the method further comprises:
responsive to determining that the first physical register is released:
writing results of the current instruction to a random access memory (RAM) designated to store payload data; and
refraining from writing the results to a physical register file;
responsive to the current instruction finishing execution, broadcasting the third ROB ID of the current instruction;
matching the third ROB ID with ROB IDs of operands of the current instruction based on an associative lookup of resulting entries in the scheduler data structure;
setting ready bits of the resulting entries in the scheduler data structure; and
indexing, directly with no additional broadcasting, entries in the payload RAM based on the resulting entries, wherein the indexed entries in the payload RAM are to receive data from an execution unit on a respective write port.

17. The non-transitory computer-readable storage medium of claim 12, wherein the method further comprises:
committing the current instruction in response to determining that all instructions in a current iteration and a prior iteration have finished execution, wherein a respective iteration corresponds to a respective window of instructions; and
responsive to determining that a branch in the current window mis-speculates, rolling back to a beginning of the prior window,
thereby facilitating correct recovery from the mis-speculation.

18. The non-transitory computer-readable storage medium of claim 12, wherein the method further comprise:
switching from a speculative register reclamation (SRR) mode to a normal mode based on a misses per kilo instructions (MPKI) counter falling below a first predetermined threshold and a branch mis-prediction rate falling above a second predetermined threshold,
wherein in the normal mode, all allocated physical registers are initially marked as not eligible for early release; and
switching from the normal mode to the SRR mode based on the MPKI counter no longer falling below the first predetermined threshold and the branch mis-prediction rate no longer falling above the second predetermined threshold,
wherein in the SRR mode, all allocated physical registers are initially marked as eligible for early release.

19. A computer system, comprising:
a processor; and
a storage device storing instructions that when executed by the processor cause the processor to perform a method, the method comprising:
determining an original instruction associated with a first logical register which is mapped to a first physical register, wherein the first physical register is initially marked as eligible for early release;
determining a current instruction associated with a current logical register and one or more operands with corresponding values produced by one or more prior instructions, wherein a prior instruction is associated with a second logical register which is mapped to a second physical register;
allocating the current logical register to a third physical register, wherein the current logical register is previously mapped to the first physical register;
determining that the first physical register is eligible for early release;
determining that the current instruction and the original instruction are executed in the same iteration or consecutive iterations; and
releasing the first physical register based upon a redefinition of the first logical register, and irrespective of whether the prior instruction has completed execution or the current instruction has been committed, thereby facilitating a reduction in a size of a corresponding physical register file.

20. The computer system of claim 19, wherein the method further comprises:
responsive to determining that the current logical register is previously mapped to the first physical register, determining that the allocation comprises the redefinition of the first logical register;
responsive to determining that the current instruction and the prior instruction are executed in different iterations, marking the second physical register as not eligible for early release,
wherein releasing the first physical register upon the redefinition of the first logical register is responsive to determining that the first physical register is eligible for early release and that the current instruction and the original instruction are executed in the same iteration or consecutive iterations, and
wherein releasing the first physical register is not based upon a completion of execution of the prior instruction or upon a commit of the current instruction; and
indicating that the first physical register is early released, thereby facilitating speculative reclamation of physical registers and reducing the size of the corresponding physical register file.

* * * * *